US012713254B2

(12) United States Patent
Jia et al.

(10) Patent No.: US 12,713,254 B2
(45) Date of Patent: Aug. 18, 2026

(54) METHOD AND APPARATUS FOR REPORTING BEAM FAILURE INFORMATION

(71) Applicant: 1FINITY Inc., Kawasaki (JP)

(72) Inventors: Meiyi Jia, Beijing (CN); Guorong Li, Beijing (CN)

(73) Assignee: 1FINITY Inc., Kawasaki (JP)

( * ) Notice: Subject to any disclaimer, the term of this patent is extended or adjusted under 35 U.S.C. 154(b) by 561 days.

(21) Appl. No.: 18/133,816

(22) Filed: Apr. 12, 2023

(65) Prior Publication Data

US 2023/0284052 A1 Sep. 7, 2023

Related U.S. Application Data

(63) Continuation of application No. PCT/CN2020/123018, filed on Oct. 22, 2020.

(51) Int. Cl.

*H04W 24/04* (2009.01)
*H04L 5/00* (2006.01)

(52) U.S. Cl.

CPC ........... *H04W 24/04* (2013.01); *H04L 5/0048* (2013.01)

(58) Field of Classification Search

CPC .... H04W 24/04; H04W 24/10; H04L 5/0048; H04L 5/001; H04L 5/005; H04L 5/0091; H04L 5/0053

See application file for complete search history.

(56) References Cited

U.S. PATENT DOCUMENTS

2020/0052769 A1 2/2020 Cirik et al.
2020/0267048 A1 8/2020 Yu et al.
2020/0267797 A1 8/2020 Wei et al.
2021/0058797 A1 2/2021 Yoshioka et al.
2022/0061117 A1* 2/2022 Liou .................... H04L 5/0053
2022/0103226 A1 3/2022 Huang et al.
2022/0123823 A1* 4/2022 Dong .................. H04B 7/0695
2022/0295302 A1* 9/2022 Matsumura ........... H04W 76/19
2023/0180332 A1* 6/2023 Agiwal ................. H04W 76/19 370/216

(Continued)

FOREIGN PATENT DOCUMENTS

CN 110798302 A 2/2020
CN 111447635 A 7/2020

(Continued)

OTHER PUBLICATIONS

Timo Koskela; "M-TRP Beam Failure Indication"; May 27, 2020 (Year: 2020).*

(Continued)

*Primary Examiner* — Ian N Moore
*Assistant Examiner* — Latresa A McCallum
(74) *Attorney, Agent, or Firm* — Myers Wolin, LLC

(57) ABSTRACT

The embodiments of the present disclosure provide a method and an apparatus for reporting beam failure information. The method includes: determining, by a terminal equipment, that it has completed candidate beam detection based on a synchronization signal block (SSB) or a channel state information reference signal (CSI-RS) in a secondary cell in which a beam failure occurs; and reporting to a network device that a beam failure occurs in the secondary cell.

18 Claims, 6 Drawing Sheets

(56) References Cited

U.S. PATENT DOCUMENTS

2023/0199529 A1* 6/2023 Koskela ................ H04L 5/0091 370/216
2023/0284052 A1* 9/2023 Jia ......................... H04W 24/04

FOREIGN PATENT DOCUMENTS

WO 2019/146498 A1 1/2019
WO 2020/092752 A1 5/2020

OTHER PUBLICATIONS

Jia-Hong Liou; "Method and Apparatus for Updating Beams and Parameters In A Wireless Communication System"; Aug. 21, 2020 (Year: 2020).*
Notice of Reasons for Refusal issued by the Japan Patent Office for corresponding Japanese Patent Application No. 2023-522757, mailed on Feb. 20, 2024, with an English translation.
Qualcomm Incorporated , "Correction on the definition of Ci field in BFR MAC CE," Change Request, 3GPP TSG-RAN2 Meeting #111-e, R2-2008053, Online, Aug. 17-28, 2020.
Notice of Reasons for Refusal issued by the Japan Patent Office for corresponding Japanese Patent Application No. 2023-522757, mailed on Jul. 16, 2024, with an English translation.
International Search Report and Written Opinion of the International Searching Authority issued by the China National Intellectual Property Administration for corresponding International Patent Application No. PCT/CN2020/123018, mailed on Jul. 21, 2021 with an English translation.
ZTE Corporation et al., "Correction on 38.321 for BFR MAC CE Design", Change Request, 3GPP TSG-RAN2 Meeting #111-e, R2-2007525, Online, Jun. 28-Aug. 17, 2020.
Qualcomm Incorporated et al., "Correction on BFR MAC CE generation", Change Request, 3GPP TSG-RAN WG2 Meeting #111 electronic, R2-2008219, Online, Aug. 17-28, 2020.
Second Notification of Office Action and Search Report issued by the China National Intellectual Property Administration for corresponding Chinese Patent Application No. 202080106081.7, mailed on Jun. 28, 2025, with an English translation.
First Notification of Office Action and Search Report issued by the China National Intellectual Property Administration for corresponding Chinese Patent Application No. 202080106081.7, mailed on Dec. 28, 2024, with an English translation.
Decision of Rejection issued by CNIPA for corresponding Chinese patent application No. 202080106081.7, mailed on Sep. 30, 2025, with an English translation.

* cited by examiner

| | | | | | | | |
|---|---|---|---|---|---|---|---|
| $C_7$ | $C_6$ | $C_5$ | $C_4$ | $C_3$ | $C_2$ | $C_1$ | SP |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bit | | | | | |

...

| | | | | | | | |
|---|---|---|---|---|---|---|---|
| AC | R | Candidate RS ID or R bit | | | | | |

METHOD AND APPARATUS FOR REPORTING BEAM FAILURE INFORMATION

CROSS-REFERENCE TO RELATED APPLICATION

This application is a continuation application of International Application PCT/CN2020/123018 filed on Oct. 22, 2020 and designated the U.S., the entire contents of which are incorporated herein by reference.

TECHNICAL FIELD

The embodiments of the present disclosure relate to the communication technology field.

BACKGROUND

In a New Radio (NR) system, transmission and reception of a beam are supported, and management of a plurality of beams is supported. A terminal equipment may perform a beam failure detection procedure and a beam failure recovery procedure. During the beam failure detection procedure, a MAC entity at a Media Access Control (MAC) layer of the terminal equipment detects a beam failure by counting beam failure instance indications from the lower layers (for example, a physical layer) to the MAC entity.

For example, the beam failure detection procedure uses a user equipment (UE) variable BFI_COUNTER. This variable is a counter of a beam failure instance indication, which is initially set to 0, and each serving cell has one BFI_COUNTER. For each serving cell configured with beam failure detection, the MAC entity will perform the following operations:

If beam failure instance indication has received from the lower layers: start or restart a beam failure detection timer beamFailureDetectionTimer; and increment the UE variable BFI_COUNTER by 1; in a case where BFI_COUNTER is greater than or equal to a maximum count value of the beam failure instance beamFailureInstanceMaxCount: if the serving cell is a secondary cell, trigger a Beam Failure Recovery (BFR) of the serving cell, otherwise initiate a random access procedure on the special cell. If beamFailureDetectionTimer expires or if beamFailure Detection Timer, beamFailureInstanceMaxCount or any of the reference signals used for beam failure detection is reconfigured by upper layers associated with this serving cell, the BFI_COUNTER is set to be 0.

The MAC entity may be configured by Radio Resource Control (RRC) per serving cell with a beam failure recovery procedure which is used for indicating to a serving network device (for example, gNB) of a new SSB or CSI-RS when beam failure is detected on the Synchronization Signal Block(s) (SSB)/Channel State Information Reference Signal (s) (CSI-RS).

When a MAC Protocol Data Unit (PDU) is transmitted by a terminal equipment to a network device, and this MAC PDU includes a BFR MAC control element (CE) or truncated BFR MAC CE which contains beam failure information of a secondary cell, the terminal equipment shall cancel all BFRs triggered for beam failure recovery of the secondary cell and before the MAC PDU assembly.

During the beam failure recovery procedure, the MAC entity will perform the following operations:

In a case where the beam failure recovery procedure determines that at least one BFR has been triggered and not cancelled:

if uplink resource (UL-SCH resources) are available for a new transmission and if the uplink resources can accommodate the BFR MAC CE plus its subheader as a result of Logical Channel Prioritization (LCP), instruct a multiplexing and assembly procedure to generate the BFR MAC CE;

if the uplink resources are available for a new transmission and if the uplink resources can accommodate the Truncated BFR MAC CE plus its subheader as a result of LCP, instruct the multiplexing and assembly procedure to generate the Truncated BFR MAC CE;

otherwise, trigger a Scheduling Request (SR) for each secondary cell for which the BFR has been triggered, and not cancelled.

Therefore, the beam failure information of the secondary cell can be carried by the BFR MAC CE or Truncated BFR MAC CE (hereinafter referred to as (Truncated) BFR MAC CE) and is transmitted by the terminal equipment to the network device.

It should be noted that the above introduction to the technical background is just to facilitate a clear and complete description of the technical solutions of the present disclosure, and is elaborated to facilitate the understanding of persons skilled in the art. It cannot be considered that the above technical solutions are known by persons skilled in the art just because these solutions are elaborated in the BACKGROUND of the present disclosure.

SUMMARY

However, the inventor finds: before candidate beam detection is completed, the terminal equipment may generate (Truncated) BFR MAC CE, but the MAC CE may not include candidate beam information, such as an ID of a candidate Reference Signal (RS). When the network device receives a MAC CE without candidate beam information, it only knows that a beam failure has occurred in a secondary cell of the terminal equipment, but there is no suitable candidate beam information. Under this case, the network device may configure an inappropriate beam for the terminal equipment, resulting in the beam failure can't be recovered.

For at least one of the above problems, the embodiments of the present disclosure provide a method and an apparatus for reporting beam failure information.

According to one aspect of the embodiments of the present disclosure, a method for reporting beam failure information is provided, including:

determining, by a terminal equipment, that candidate beam evaluation based on a synchronization signal block or a channel state information reference signal in a secondary cell in which a beam failure occurs has been completed; and reporting to a network device that a beam failure occurs in the secondary cell.

According to another aspect of the embodiments of the present disclosure, an apparatus for reporting beam failure information is provided, including:

a detecting unit configured to detect one or more candidate beams; and a reporting unit configured to report a beam failure in a secondary cell in which candidate beam evaluation based on a synchronization signal block or a channel state information reference signal has been completed.

According to another aspect of the embodiments of the present disclosure, a method for reporting beam failure information is provided, including:

determining, by a terminal equipment, that candidate beam evaluation based on a synchronization signal block or a channel state information reference signal in a secondary cell in which a beam failure occurs has been completed; and reporting to a network device a media access control protocol data unit including beam failure information of the secondary cell.

According to another aspect of the embodiments of the present disclosure, an apparatus for reporting beam failure information is provided, including:

a detecting unit configured to detect one or more candidate beams; and a reporting unit configured to report to a network device a media access control protocol data unit including beam failure information on a secondary cell in which candidate beam evaluation based on a synchronization signal block or a channel state information reference signal has been completed.

According to another aspect of the embodiments of the present disclosure, a method for reporting beam failure information is provided, including:

detecting, by a terminal equipment, that a beam failure occurs in a secondary cell;

before candidate beam evaluation based on a synchronization signal block or a channel state information reference signal has been completed in the secondary cell, or before one or more candidate beam identifiers of the secondary cell are received, or during an evaluation period of the candidate beam evaluation based on a synchronization signal block or a channel state information reference signal in the secondary cell, not reporting that a beam failure occurs in the secondary cell, and/or, not instructing a multiplexing and assembly procedure to generate a beam failure recovery media access control control element or a truncated beam failure recovery media access control control element.

According to another aspect of the embodiments of the present disclosure, an apparatus for reporting beam failure information is provided, including:

a detecting unit configured to detect that a beam failure occurs in a secondary cell; and a processing unit configured to, before candidate beam evaluation based on a synchronization signal block or a channel state information reference signal has been completed in the secondary cell, or before one or more candidate beam identifiers of the secondary cell are received, or during an evaluation period of the candidate beam detection based on a synchronization signal block or a channel state information reference signal in the secondary cell, not to report that a beam failure occurs in the secondary cell, and/or, not to instruct a multiplexing and assembly procedure to generate a beam failure recovery media access control control element or a truncated beam failure recovery media access control control element.

One of advantageous effects of the embodiments of the present disclosure is: in a case where it has completed candidate beam detection based on a synchronization signal block (SSB) or a channel state information reference signal (CSI-RS) in a secondary cell in which a beam failure occurs, a terminal equipment reports to a network device that a beam failure occurs in the secondary cell, or reports to a network device a media access control (MAC) protocol data unit (PDU) including beam failure information of a secondary cell. Thereby, the network device will not configure an inappropriate beam for the terminal equipment, so as to reduce or avoid situations that the beam failure can't be recovered.

Referring to the later description and figures, specific implementations of the present disclosure are disclosed in detail, indicating a manner that the principle of the present disclosure can be adopted. It should be understood that the implementations of the present disclosure are not limited in terms of the scope. Within the scope of the spirit and terms of the appended claims, the implementations of the present disclosure include many changes, modifications and equivalents.

Features that are described and/or shown with respect to one implementation can be used in the same way or in a similar way in one or more other implementations, can be combined with or replace features in the other implementations.

It should be emphasized that the term "comprise/include" when being used herein refers to the presence of a feature, a whole piece, a step or a component, but does not exclude the presence or addition of one or more other features, whole pieces, steps or components.

BRIEF DESCRIPTION OF THE DRAWINGS

Elements and features described in one drawing or embodiment of the invention can be combined with an element and a feature shown in one or more other figures or implementations. In addition, in the drawings, like reference numerals designate corresponding parts throughout the several views and may be used to designate like or similar parts in more than one embodiments.

DETAILED DESCRIPTION

Figure 1:
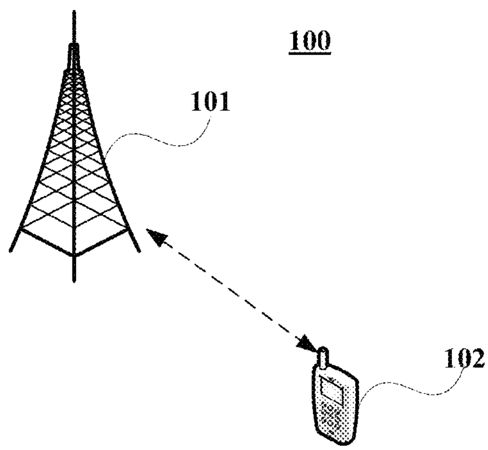
FIG. 1 is a schematic diagram of a communication system of the embodiments of the present disclosure.

Referring to the figures, through the following Description, the above and other features of the present disclosure will become obvious. The Description and figures specifically disclose particular implementations of the present disclosure, showing partial implementations which can adopt the principle of the present disclosure. It should be understood that the present disclosure is not limited to the described implementations, on the contrary, the present disclosure includes all the modifications, variations and equivalents falling within the scope of the attached claims.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to . . . ", the term "based on" should be understood as "at least partially based on . . . ", unless the context clearly indicates otherwise.

In the embodiments of the present disclosure, the term "a communication network" or "a wireless communication network" may refer to a network that meets any of the following communication standards, such as Long Term Evolution (LTE), LTE-Advanced (LTE-A), Wideband Code Division Multiple Access (WCDMA), High-Speed Packet Access (HSPA) and so on.

And, communication between devices in a communication system can be carried out according to a communication protocol at any stage, for example may include but be not limited to the following communication protocols: 1G (generation), 2G, 2.5G, 2.75G, 3G, 4G, 4.5G, 5G, New Radio (NR) and so on, and/or other communication protocols that are currently known or will be developed in the future.

In the embodiments of the present disclosure, the term "a network device" refers to, for example, a device that connects a terminal equipment in a communication system to a communication network and provides services to the terminal equipment. The network device may include but be not limited to the following devices: Base Station (BS), Access Point (AP), Transmission Reception Point (TRP), a broadcast transmitter, Mobile Management Entity (MME), a gateway, a server, Radio Network Controller (RNC), Base Station Controller (BSC) and so on.

The base station may include but be not limited to: node B (NodeB or NB), evolution node B (eNodeB or eNB) and a 5G base station (gNB), etc., and may further includes Remote Radio Head (RRH), Remote Radio Unit (RRU), a relay or a low power node (such as femeto, pico, etc.), Integrated Access and Backhaul (IAB) node or IAB-DU or IAB-donor. And the term "BS" may include their some or all functions, each BS can provide communication coverage to a specific geographic region. The term "a cell" may refer to a BS and/or its coverage area, which depends on the context in which this term is used. Where there is no confusion, the terms "cell" and "BS" are interchangeable.

In the embodiments of the present disclosure, the term "User Equipment (UE)" or "Terminal Equipment (TE) or Terminal Device" refers to, for example, a device that accesses a communication network and receives network services through a network device. The terminal equipment can be fixed or mobile, and can also be referred to as Mobile Station (MS), a terminal, Subscriber Station (SS), Access Terminal (AT), IAB-MT, a station and so on.

The terminal equipment may include but be not limited to the following devices: Cellular Phone, Personal Digital Assistant (PDA), a wireless modem, a wireless communication device, a handheld device, a machine-type communication device, a laptop computer, a cordless phone, a smart phone, a smart watch, a digital camera and so on.

For another example, under a scenario such as Internet of Things (IoT), the terminal equipment may also be a machine or apparatus for monitoring or measurement, for example may include but be not limited to: a Machine Type Communication (MTC) terminal, a vehicle-mounted communication terminal, a Device to Device (D2D) terminal, a Machine to Machine (M2M) terminal and so on.

Moreover, the term "a network side" or "a network device side" refers to a side of a network, may be a base station, and may include one or more network devices as described above. The term "a user side" or "a terminal side" or "a terminal equipment side" refers to a side of a user or terminal, may be a UE, and may include one or more terminal equipment as described above. If it is not specifically mentioned herein, "a device" may refer to a network device, or may refer to a terminal equipment.

The scenarios of the embodiments of the present disclosure are described through the following examples, however the present disclosure is not limited to these.

FIG. 1 is a schematic diagram of a communication system in the embodiments of the present disclosure, schematically describes situations by taking a terminal equipment and a network device as examples, as shown in FIG. 1, a communication system 100 may include a network device 101 and a terminal equipment 102. For simplicity, FIG. 1 only takes one terminal equipment and one network device as examples for description, however the embodiments of the present disclosure are not limited to these, for example there may be multiple terminal equipment.

In the embodiments of the present disclosure, transmission of existing or further implementable services can be carried out between the network device 101 and the terminal equipment 102. For example, these services may include but be not limited to: enhanced Mobile Broadband (eMBB), massive Machine Type Communication (mMTC), Ultra-Reliable and Low-Latency Communication (URLLC) and so on.

During the beam failure recovery procedure, beam failure information of a secondary cell may be carried by BFR MAC CE or Truncated BFR MAC CE, and is sent by the terminal equipment to the network device.

Figure 2:
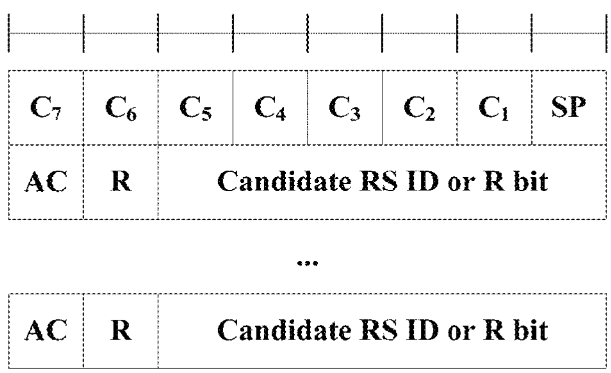
FIG. 2 is a schematic diagram of BFR MAC CE or Truncated BFR MAC CE of a first format.
Figures 3, 4:
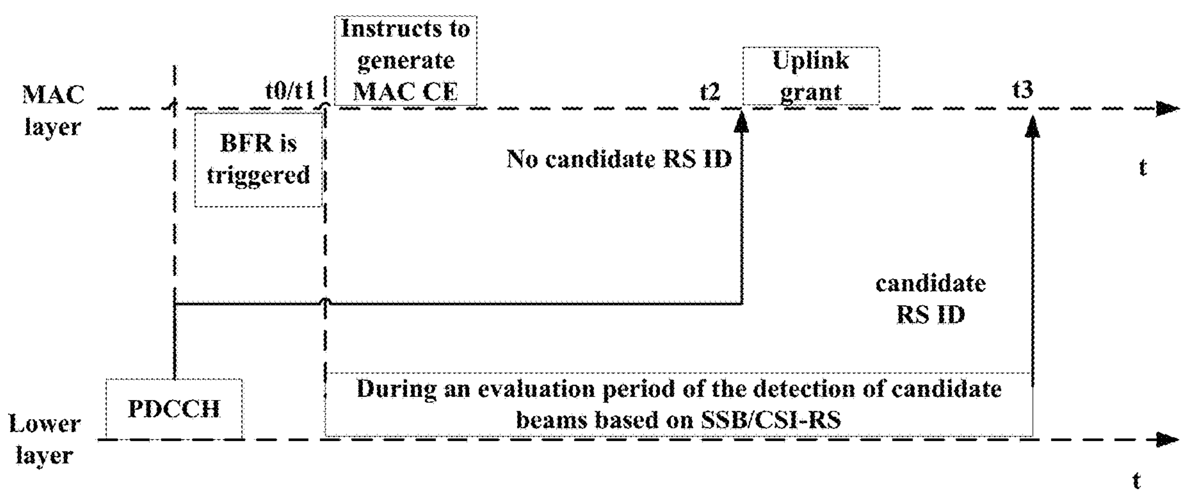
FIG. 3 is a schematic diagram of BFR MAC CE or Truncated BFR MAC CE of a second format.
FIG. 4 is a schematic diagram of a scenario in which a terminal equipment reports beam failure information, in the embodiments of the present disclosure.

FIG. 2 is a schematic diagram of BFR MAC CE or Truncated BFR MAC CE of a first format (referred to as Format 1). FIG. 3 is a schematic diagram of BFR MAC CE or Truncated BFR MAC CE of a second format (referred to as Format 2).

Specifically, for example, for BFR MAC CE, if a highest serving cell index ServCellIndex of the secondary cell in which a beam failure is detected by the MAC entity is less than 8, Format 1 in FIG. 2 is used; otherwise Format 2 in FIG. 3 is used. For Truncated BFR MAC CE, if a highest serving cell index ServCellIndex of the secondary cell in which a beam failure is detected by the MAC entity is less than 8, or a beam failure is detected in a special cell and the special cell will be included in a Truncated BFR MAC CE and a result of LCP is that a UL-SCH resource cannot accommodate the Truncated BFR MAC CE of Format 2 in FIG. 3 plus its subheader, Format 1 in FIG. 2 is used; otherwise Format 2 in FIG. 3 is used.

For example, fields for Format 1 and Format 2 are defined as follows: For BFR MAC CE, a Ci field indicates beam failure detection of a secondary cell with ServCellIndex i and the presence of a byte that includes an AC field, the AC field indicates whether there is a Candidate RS ID field in this byte, the Candidate RS ID field is set to be an index of SSB or CSI-RS.

The Ci field set to 1 indicates that beam failure is detected in the secondary cell with ServCellIndex i and a byte that includes the AC field is present. The Ci field set to 0 indicates that beam failure is not detected in the secondary cell with ServCellIndex i and a byte that includes the AC field is not present. The bytes that include the AC field are present in ascending order based on the ServCellIndex.

For Truncated BFR MAC CE, a Ci field indicates beam failure detection of a secondary cell with ServCellIndex i, an AC field indicates whether there exist a Candidate RS ID field in this byte, the Candidate RS ID field is set to be an index of SSB or CSI-RS.

The Ci field set to 1 indicates that beam failure is detected in the secondary cell with ServCellIndex i and a byte that includes the AC field may be present. The Ci field set to 0 indicates that beam failure is not detected in the secondary cell with ServCellIndex i and a byte that includes the AC field is not present. If present, the bytes that include the AC field appear in ascending order based on the ServCellIndex. The number of bytes that include the AC field may be 0, while not exceeding an available grant size.

The above schematically describes (Truncated) BFR MAC CE, the following describes relevant scenarios of the embodiments of the present disclosure.

FIG. 4 is a schematic diagram of a scenario in which a terminal equipment reports beam failure information, in the embodiments of the present disclosure, and shows a situation in which when the BFR is triggered but has not been cancelled yet, a lower layer has not completed evaluation of candidate beam information (RS ID) yet but has an UL grant capable of accommodating the (Truncated) BFR MAC CE.

As shown in FIG. 4, for example, t0 is the time when BFR is triggered, t1 is the time when MAC CE is generated, t2 is the time when UL grant for transmitting MAC CE arrives, t3 is the time when a lower layer completes candidate beam detection and/or a lower layer provides candidate beam information (RS ID) to the MAC entity. It takes the UL grant as dynamic scheduling as an example in FIG. 4, but the embodiments of the present disclosure are not limited to this, this UL grant may also be a Configured Grant (CG).

As shown in FIG. 4, for example, before triggering the BFR, the MAC entity already knows that uplink resources are available at the moment t2 via DCI of a PDCCH (Physical Downlink Control Channel). In this way, when the BFR is triggered, that is, at the moment t0, the MAC entity may indicate the multiplexing and assembly procedure to generate (Truncated) BFR MAC CE. The multiplexing and assembly procedure may generate this MAC CE and assemble MAC PDU including this MAC CE at any moment between t0 and t2.

Figure 5:
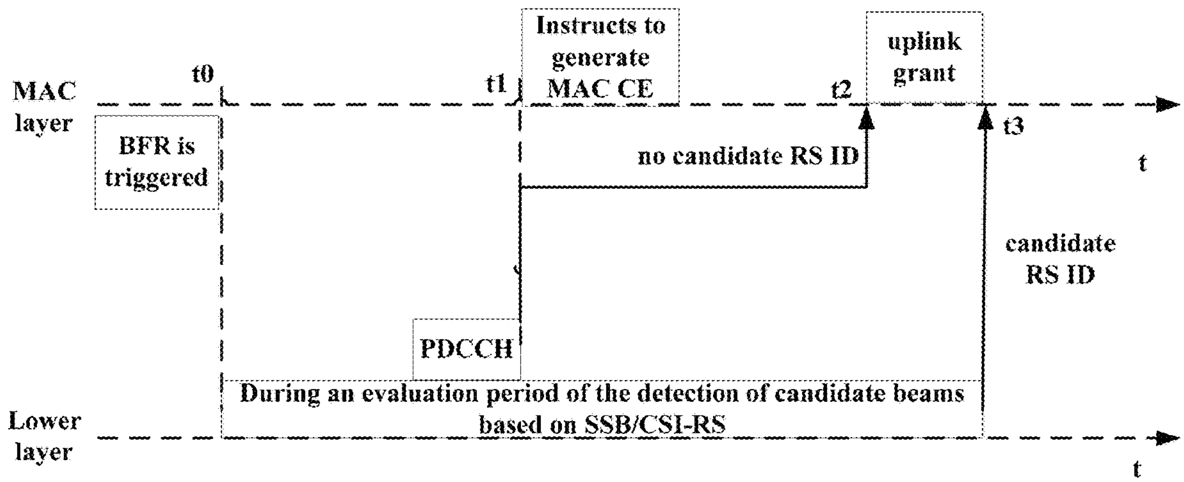
FIG. 5 is another schematic diagram of a scenario in which a terminal equipment reports beam failure information, in the embodiments of the present disclosure.

FIG. 5 is another schematic diagram of a scenario in which a terminal equipment reports beam failure information, in the embodiments of the present disclosure, and shows a situation in which when the BFR is triggered, a lower layer has not completed evaluation of candidate beam information (RS ID) yet but has an UL grant capable of accommodating the (Truncated) BFR MAC CE.

As shown in FIG. 5, for example, t0 is the time when BFR is triggered, t1 is the time when indicating to generate MAC CE, t2 is the time when UL grant for transmitting MAC CE arrives, t3 is the time when a lower layer completes candidate beam detection and/or a lower layer provides candidate beam information (RS ID) to the MAC entity. It takes the UL grant as dynamic scheduling as an example in FIG. 5, but the embodiments of the present disclosure are not limited to this, this UL grant may also be a Configured Grant (CG).

As shown in FIG. 5, for example, at the moment t0 when the BFR is triggered, the MAC entity knows that no uplink resource is currently available for transmitting (Truncated) BFR MAC CE. According to the current process, if no uplink resource is available, the MAC entity will trigger a SR to request an uplink resource. In fact, the MAC entity may wait for a period of time before triggering the SR, as long as the triggered SR is guaranteed to be sent to the network device at a specified time. During the MAC entity's waiting period, it is possible that the network device will provide the UL grant so that the MAC entity does not need to trigger the SR to obtain the uplink resource.

As shown in FIG. 5, at the moment to, the MAC entity triggers the BFR, but no uplink resource is available for transmitting (Truncated) BFR MAC CE. The MAC entity waits for a period of time. At the moment t1, via the DCI of the PDCCH, the MAC entity knows the UL grant for transmitting (Truncated) BFR MAC CE, and may indicate a multiplexing and assembly procedure to generate this MAC CE. The multiplexing and assembly procedure may generate this MAC CE and assemble the MAC PDU including the MAC CE at any moment before the moment t2.

However, as shown in FIG. 4 and FIG. 5, the moment t3 at which the lower layer provides candidate beam information (RS ID) to the MAC entity is later than the moment t1 at which the MAC entity knows that the UL grant capable of accommodating (Truncated) BFR MAC CE is present, or is later than the moment t2 at which the UL grant arrives. In this case, the generated MAC CE does not include candidate beam information (RS ID).

When the network device receives a MAC CE without candidate beam information, it only knows that a beam failure has occurred in a secondary cell of the terminal equipment, but no candidate beam information transmitted by the terminal equipment is received. In this case, the network device may configure an inappropriate beam for the terminal equipment, resulting in that the beam failure can't be recovered.

For the above problem, the following further describes the embodiments of the present disclosure. The embodiments of the present disclosure are described from a MAC layer of the terminal equipment and implemented by the MAC entity. The MAC entity includes a beam failure detection procedure, a beam failure recovery procedure and a multiplexing and assembly entity (hereinafter also referred to as a multiplexing and assembly procedure), etc. The lower layer in the embodiments of the present disclosure is, for example, a physical layer, an antenna unit, a measurement procedure, etc. For specific concepts and definitions of each layer and each entity, please refer to relevant technologies, which are not repeated in the embodiments of the present disclosure.

Embodiments of a First Aspect

Figure 6:
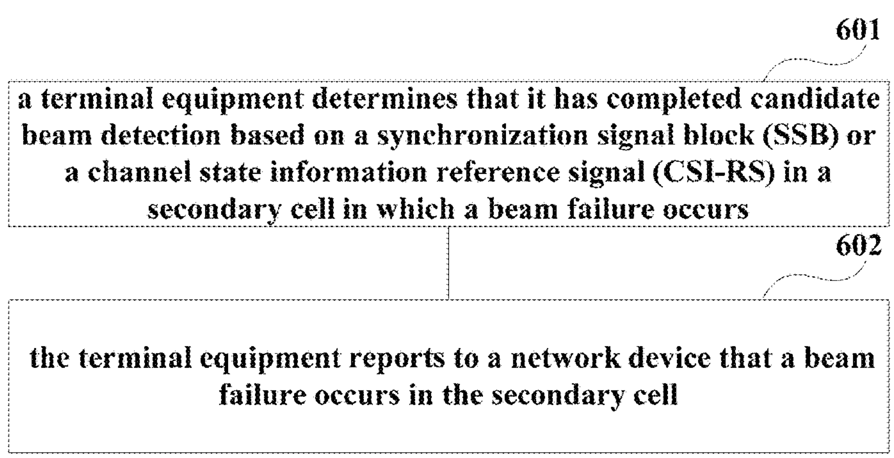
FIG. 6 is a schematic diagram of a method for reporting beam failure information in the embodiments of the present disclosure.

The embodiments of the present disclosure provide a method for reporting beam failure information, which will be described from a terminal equipment. FIG. 6 is a schematic diagram of a method for reporting beam failure information in the embodiments of the present disclosure, as shown in FIG. 6, the method includes:

601, a terminal equipment determines that it has completed candidate beam detection based on a synchronization signal block (SSB) or a channel state information reference signal (CSI-RS) in a secondary cell in which a beam failure occurs; and

602, the terminal equipment reports to a network device that a beam failure occurs in the secondary cell.

It's worth noting that the above FIG. 6 is only schematic description of the embodiments of the present disclosure, but the present disclosure is not limited to this. For example, an execution sequence of each operation may be adjusted appropriately, moreover other some operations may be increased or reduced. Persons skilled in the art may make appropriate modifications according to the above contents, not limited to the records in the above FIG. 6.

In the embodiments of the present disclosure, a SSB or CSI-RS based candidate beam may be detected. Specifically, for example, if L1-RSRP of a SSB/CSI-RS included in a reference signal list candidateBeamRSSCellList of candidate beams for recovery is greater than a threshold value during an evaluation period, an index of the SSB/CSI-RS is included in the Candidate RS ID field of MAC CE; the index refers to an index of a corresponding entry of the SSB/CSI-RS in the candidate BeamRSSCellList, for example index 0 corresponds to the first entry in the candidateBeamRSSCellList, index 1 corresponds to the second entry in this list . . . .

In some embodiments, a terminal equipment determines that it has completed candidate beam detection based on a synchronization signal block (SSB) or a channel state information reference signal (CSI-RS) in a secondary cell in which a beam failure occurs in 601 specifically includes: a media access control (MAC) entity of the terminal equipment determines that candidate beam detection based on a synchronization signal block or a channel state information reference signal has been completed in the secondary cell, and/or, the media access control (MAC) entity of the terminal equipment receives one or more candidate beam identifiers of the secondary cell from a lower layer.

In some embodiments, before the candidate beam detection based on a SSB or a CSI-RS has been completed in the secondary cell, or before one or more candidate beam identifiers of the secondary cell from a lower layer are received, or during an evaluation period of the candidate beam detection based on a SSB or a CSI-RS in the secondary cell, the media access control (MAC) entity of the terminal equipment does not report that a beam failure occurs in the secondary cell.

For example, before the candidate beam detection based on a SSB/CSI-RS is completed in a cell, or before candidate RS IDs of a cell from a lower layer are received, or during an evaluation period of the candidate beam detection based on a SSB/CSI-RS in a cell, or if a lower layer is performing the candidate beam detection based on a SSB/CSI-RS in a cell, or if a lower layer has not completed the candidate beam detection based on a SSB/CSI-RS in a cell yet, or before end of an evaluation period of the candidate beam detection based on a SSB/CSI-RS in a cell, and so on, the MAC entity of the terminal equipment does not report that a beam failure occurs in the cell.

Thereby, the network device does not know that a beam failure occurs in the cell, and it does not perform beam management for the cell and configure an inappropriate beam for the cell. Instead, it waits for a subsequent failure indication carrying candidate beam information (RS ID) and performs reconfiguration based on this information.

In some embodiments, in a case where the media access control (MAC) entity determines that the secondary cell has triggered beam failure recovery and the beam failure recovery is not canceled, it indicates to generate a corresponding media access control (MAC) control element (CE) or truncated media Access control (MAC) control element (CE).

In some embodiments, the media access control (MAC) entity does not report that a beam failure occurs in the secondary cell, in the media access control (MAC) control element (CE) or truncated media access control (MAC) control element (CE).

For example, the media access control (MAC) entity sets indication information (Ci field) to which the secondary cell corresponds to be 0 in the media access control (MAC) control element (CE) or the truncated media access control (MAC) control element (CE), and a field (AC field) carrying candidate beam information to which the secondary cell corresponds is not included.

In some embodiments, it may be considered that a failure is not detected, or it is not considered that a failure is detected.

For example, for BFR MAC CE, the meaning of the Ci field may be explained as shown in Table 1:

TABLE 1

| |
|---|
| $C_i$ (BFR MAC CE): This field indicates beam failure detection (as specified in clause 5.17) and the presence of an octet containing the AC field for the SCell with ServCellIndex i as specified in TS 38.331 [5]. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present for the SCell with ServCellIndex i. The MAC entity considers that the beam failure is not detected when the MAC entity is in the process of evaluating the candidate beams. The octets containing the AC field are present in ascending order based on the ServCellIndex. |

For example, for Truncated BFR MAC CE, the meaning of the Ci field may be explained as shown in Table 2:

TABLE 2

| |
|---|
| $C_i$ (Truncated BFR MAC CE): This field indicates beam failure detection (as specified in clause 5.17) for the SCell with ServCellIndex i as specified in TS 38.331 [5]. The $C_i$ field set to 1 indicates that beam failure is detected and the octet containing the AC field for the SCell with ServCellIndex i may be present. The $C_i$ field set to 0 indicates that the beam failure is |

TABLE 2-continued

| |
|---|
| not detected and the octet containing the AC field is not present for the SCell with ServCellIndex i. The MAC entity considers that the beam failure is not detected when the MAC entity is in the process of evaluating the candidate beams. The octets containing the AC field, if present, are included in ascending order based on the ServCellIndex. The number of octets containing the AC field included is maximised, while not exceeding the available grant size. |

In some embodiments, it may be considered that bytes including the AC field are not present.

For example, for BFR MAC CE, the meaning of the Ci field may be explained as shown in Table 3:

TABLE 3

| |
|---|
| $C_i$ (BFR MAC CE): This field indicates beam failure detection (as specified in clause 5.17) and the presence of an octet containing the AC field for the SCell with ServCellIndex i as specified in TS 38.331 [5]. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present or the beam failure is detected and the MAC entity is in the process of evaluating the candidate beams for the SCell with ServCellIndex i. The octets containing the AC field are present in ascending order based on the ServCellIndex. |

For example, for Truncated BFR MAC CE, the meaning of the Ci field may be explained as shown in Table 4:

TABLE 4

| |
|---|
| $C_i$ (Truncated BFR MAC CE): This field indicates beam failure detection (as specified in clause 5.17) for the SCell with ServCellIndex i as specified in TS 38.331 [5]. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present or the beam failure is detected and the MAC entity is in the process of evaluating the candidate beams for the SCell with ServCellIndex i. The octets containing the AC field, if present, are included in ascending order based on the ServCellIndex. The number of octets containing the AC field included is maximised, while not exceeding the available grant size. |

In the embodiments of the present disclosure, the MAC entity instructs that a moment at which a multiplexing and assembly procedure generates MAC CE may be different from a moment at which the multiplexing and assembly procedure is generated and assembled, so a content and size of the MAC CE may change.

The following describes using of BFR MAC CE or Truncated BFR MAC CE.

In some embodiments, the media access control (MAC) entity instructs a multiplexing and assembly procedure to generate a beam failure recovery (BFR) media access control (MAC) control element (CE), and generate a beam failure recovery (BFR) media access control (MAC) control element (CE) or a truncated beam failure recovery (BFR) media access control (MAC) control element (CE) in the multiplexing and assembly procedure.

For example, the multiplexing and assembly procedure may generate BFR MAC CE or Truncate BFR MAC CE if the MAC entity instructs the multiplexing and assembly procedure to generate BFR MAC CE. For example, the multiplexing and assembly procedure may generate BFR MAC CE or Truncated BFR MAC CE based on a size of a UL grant. Thereby, an adjustment can be made appropriately according to the UL grant, etc., which helps to provide more information about beam failure and recovery or helps to save signaling overhead.

By taking FIG. 4 as an example, at the moment to, if the beam failure recovery procedure determines that at least one BFR has been triggered and is not cancelled, and if the UL-SCH resource is available for a new transmission and if a result of the LCP is that this UL-SCH resource can accommodate BFR MAC CE plus its subheader, the MAC entity will instruct the multiplexing and assembly procedure to generate BFR MAC CE.

However, at the moment t2, i.e., when MAC CE is generated in the multiplexing and assembly procedure, because that for example the number of cells that need to report beam failure and recovery information increases or higher priority information needs to be generated for MAC CE, a result of LCP is that this UL-SCH resource cannot accommodate BFR MAC CE plus its subheader, but can accommodate Truncated BFR MAC CE plus its subheader, then the multiplexing and assembly procedure may generate Truncated BFR MAC CE.

In some embodiments, the media access control (MAC) entity instructs a multiplexing and assembly procedure to generate a truncated beam failure recovery (BFR) media access control (MAC) control element (CE), and generate a beam failure recovery (BFR) media access control (MAC) control element (CE) or a truncated beam failure recovery (BFR) media access control (MAC) control element (CE) in the multiplexing and assembly procedure.

For example, the multiplexing and assembly procedure may generate BFR MAC CE or Truncate BFR MAC CE if the MAC entity instructs the multiplexing and assembly procedure to generate Truncated BFR MAC CE. For example, the multiplexing and assembly procedure may generate BFR MAC CE or Truncated BFR MAC CE based on a size of a UL grant. Thereby, an adjustment can be made appropriately according to the UL grant, etc., which helps to provide more information about beam failure and recovery or helps to save signaling overhead.

By taking FIG. 4 as an example, at the moment to, if the beam failure recovery procedure determines that at least one BFR has been triggered and is not cancelled, and if the UL-SCH resource is available for a new transmission and if a result of the LCP is that this UL-SCH resource cannot accommodate BFR MAC CE plus its subheader but can accommodate Truncated BFR MAC CE plus its subheader, the MAC entity will instruct the multiplexing and assembly procedure to generate Truncated BFR MAC CE.

However, at the moment t2, i.e., when MAC CE is generated in the multiplexing and assembly procedure, because that for example the number of cells that need to report beam failure and recovery information decreases or higher priority information that was intended to be sent no longer needs to be sent, a result of LCP is that the UL-SCH resource is available for a new transmission and the result of LCP is this UL-SCH resource can accommodate BFR MAC CE plus its subheader, then the multiplexing and assembly procedure may generate BFR MAC CE.

In some embodiments, the media access control (MAC) entity instructs a multiplexing and assembly procedure to generate a media access control (MAC) control element (CE) carrying beam failure and recovery information of a secondary cell, and generate a beam failure recovery (BFR) media access control (MAC) control element (CE) or a truncated beam failure recovery (BFR) media access control (MAC) control element (CE) in the multiplexing and assembly procedure.

In the multiplexing and assembly procedure, it is determined whether the beam failure recovery (BFR) media access control (MAC) control element (CE) or the truncated beam failure recovery (BFR) media access control (MAC) control element (CE) is generated.

For example, the MAC entity instructs the multiplexing and assembly procedure to generate MAC CE that carries information on beam failure detection and recovery of a secondary cell, for example including BFR MAC CE or Truncated BFR MAC CE; the multiplexing and assembly procedure determines whether to generate BFR MAC CE or to generate Truncated BFR MAC CE. For example, the multiplexing and assembly procedure determines and generates BFR MAC CE or Truncated BFR MAC CE based on a result of the LCP of the UL-SCH resource available for new transmission. Thereby, the multiplexing and assembly procedure determines and generates BFR MAC CE or Truncated BFR MAC CE, which helps to increase flexibility.

By taking FIG. 4 as an example, at the moment to, if the beam failure recovery procedure determines that at least one BFR has been triggered and is not cancelled, the MAC entity will instruct the multiplexing and assembly procedure to generate a MAC CE carrying beam failure and recovery information of a secondary cell.

At the moment t2, i.e., when this MAC CE is generated in the multiplexing and assembly procedure, if the result of LCP is this UL-SCH resource can accommodate BFR MAC CE plus its subheader, then the multiplexing and assembly procedure may determine and generate BFR MAC CE.

At the moment t2, i.e., when the MAC CE is generated in the multiplexing and assembly procedure, if the result of LCP is that this UL-SCH resource cannot accommodate BFR MAC CE plus its subheader but can accommodate Truncated BFR MAC CE plus its subheader, then the multiplexing and assembly procedure may determine and generate Truncated BFR MAC CE.

In some embodiments, the media access control (MAC) entity instructs a multiplexing and assembly procedure to generate a beam failure recovery (BFR) media access control (MAC) control element (CE), and once the instruction of the media access control (MAC) entity is received, the beam failure recovery (BFR) media access control (MAC) control element (CE) is generated in the multiplexing and assembly procedure; or The media access control (MAC) entity instructs a multiplexing and assembly procedure to generate a truncated beam failure recovery (BFR) media access control (MAC) control element (CE), and once the instruction of the media access control (MAC) entity is received, the truncated beam failure recovery (BFR) media access control (MAC) control element (CE) is generated in the multiplexing and assembly procedure.

For example, a moment at which the MAC entity instructs the multiplexing and assembly procedure to generate MAC CE is the same as a moment at which the multiplexing and assembly procedure generates the MAC CE, i.e., the MAC entity instructs the multiplexing and assembly procedure to generate (Truncated) BFR MAC CE, then the multiplexing and assembly procedure immediately generates the (Truncated) BFR MAC CE.

By taking FIG. 4 as an example, at the moment t0, if the beam failure recovery procedure determines that at least one BFR has been triggered and is not cancelled, and if the UL-SCH resource is available for a new transmission and if a result of the LCP is that this UL-SCH resource can accommodate BFR MAC CE plus its subheader, the MAC entity will instruct the multiplexing and assembly procedure to generate BFR MAC CE. At the moment t0, the multiplexing and assembly procedure generates BFR MAC CE.

By taking FIG. 4 as an example, at the moment t0, if the beam failure recovery procedure determines that at least one BFR has been triggered and is not cancelled, and if the UL-SCH resource is available for a new transmission and if a result of the LCP is that this UL-SCH resource cannot accommodate BFR MAC CE plus its subheader but can accommodate Truncated BFR MAC CE plus its subheader, the MAC entity will instruct the multiplexing and assembly procedure to generate Truncated BFR MAC CE. At the moment t0, the multiplexing and assembly procedure generates Truncated BFR MAC CE.

The above schematically describes BFR MAC CE or Truncated BFR MAC CE, the following describes MAC CE of Format 1 or Format 2.

In an existing mechanism, use of MAC CE of Format 1 or Format 2 is determined according to the highest serving cell index ServCellIndex of the secondary cell where the MAC entity detects a beam failure.

For example, it is assumed that a beam failure is detected in secondary cells with ServCellIndex=2 and ServCellIndex=10, according to a current mechanism, the highest serving cell index of the secondary cell where the MAC entity detects the beam failure ServCellIndex=10, which is greater than 8, the MAC entity determines to use MAC CE of Format 2, that is, including a 4-byte bitmap. In the embodiments of the present disclosure, for example even if a beam failure is detected in a secondary cell, the beam failure may not be reported to a network device. Thereby, in a case where the MAC entity detects a beam failure in the secondary cell with ServCellIndex=10 but does not report the beam failure, MAC CE of Format 1 (that is, including a 1-byte bitmap) has been sufficient, there is no need to use MAC CE of Format 2 (including a 4-byte bitmap). Thus, existing mechanisms will add signaling overhead.

In some embodiments, use of Format 1 or Format 2 is determined according to the highest serving cell index ServCellIndex of the secondary cell where the corresponding indication information (Ci field) in the MAC entity is set to be 1. Thereby, signaling overhead can be reduced.

For example, in a case where a highest serving cell index ServCellIndex that is less than 8 with indication information (Ci field) to which a secondary cell in a media access control (MAC) entity corresponds set to be 1, a beam failure recovery (BFR) media access control (MAC) control element (CE) of a first format is used, and in a case where the highest serving cell index ServCellIndex that is greater than or equal to 8 with indication information (Ci field) set to be 1, a beam failure recovery (BFR) media access control (MAC) control element (CE) of a second format is used by a terminal equipment.

For example, for BFR MAC CE, if a highest serving cell index ServCellIndex that is less than 8 with indication information (Ci field) to which a secondary cell in a media access control (MAC) entity corresponds set to be 1, Format 1 as shown in FIG. 2 is used; otherwise, Format 2 as shown in FIG. 3 is used.

For the above meanings, Table 5 may be referred to:

TABLE 5

| |
|---|
| For BFR MAC CE, a single octet bitmap is used when the highest ServCellIndex of this MAC entity's SCell for which Ci field in the BFR MAC CE is set to 1 is less than 8, otherwise four octets are used. A MAC PDU shall contain at most one BFR MAC CE. |

Moreover, for example, if the AC field is set to be 1, it represents that it also contains a Candidate RS ID field in this byte including the AC field, the Candidate RS ID field is an index of SSB or CSI-RS. If the AC field is set to be 0, it represents that there is no Candidate RS ID field in this byte including the AC field, remaining bits of the byte are idle bits.

For example, it is assumed that a beam failure is detected in secondary cells with ServCellIndex=2 and ServCellIndex=10, but in the embodiments of the present disclosure, a beam failure in a secondary cell with ServCellIndex=10 is not reported. in this case, C2=1, C10=0, a highest serving cell index with Ci field to which a secondary cell corresponds set to be 1 ServCellIndex=2 which is less than 8, Format 1 as shown in FIG. 2 is used, that is, BFR MAC CE of a 1-byte bitmap. Thereby, signaling overhead can be reduced.

For another example, in a case where a highest serving cell index that is less than 8 with indication information (Ci field) to which a secondary cell in a media access control (MAC) entity corresponds set to be 1, or a Ci field to which a special cell corresponds is set to be 1 and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, if a highest serving cell index ServCellIndex that is less than 8 with Ci field to which a secondary cell in an entity corresponds set to be 1, or a Ci field to which a special cell corresponds is set to be 1 and the special cell will be included in a Truncated BFR MAC CE and a result of LCP is a UL-SCH resource cannot accommodate the Truncated BFR MAC CE of Format 2 in FIG. 3 plus its subheader, Format 1 as shown in FIG. 2 is used; otherwise Format 2 as shown in FIG. 3 is used. Thereby, signaling overhead can be reduced.

For the above meanings, Table 6 may be referred to:

TABLE 6

| |
|---|
| For Truncated BFR MAC CE, a single octet bitmap is used for the following cases, otherwise four octets are used:<br>the highest ServCellIndex of this MAC entity's SCell for which Ci field in the BFR MAC CE is set to 1 is less than 8; or<br>beam failure is detected for SpCell (as specified in Clause 5.17) and the SpCell is to be indicated in a Truncated BFR MAC CE and the UL-SCH resources available for transmission cannot accommodate the Truncated BFR MAC CE with the four octets bitmap plus its subheader as a result of LCP. |

Moreover, for example, if the AC field is set to be 1, it represents that it also contains a Candidate RS ID field in this byte including the AC field, the Candidate RS ID field is an index of SSB or CSI-RS. If the AC field is set to be 0, it represents that there is no Candidate RS ID field in this byte including the AC field, remaining bits of the byte are idle bits.

For example, for Truncated BFR MAC CE, it is assumed that a beam failure is detected in secondary cells with ServCellIndex=2 and ServCellIndex=10, but in the embodiments of the present disclosure, a beam failure in a secondary cell with ServCellIndex=10 is not reported. In this case, C2=1, C10=0, a highest serving cell index with Ci field to which a secondary cell corresponds set to be 1 ServCellIndex=2 which is less than 8, Format 1 as shown in FIG. 2 is used, that is, Truncated BFR MAC CE of a 1-byte bitmap. Thereby, signaling overhead can be reduced.

In some embodiments, using of MAC CE of Format 1 or Format 2 is determined according to the highest serving cell index ServCellIndex of the secondary cell where a beam failure is reported in the MAC entity. Thereby, signaling overhead can be reduced.

For example, in a case where a highest serving cell index of a secondary cell where it reports a beam failure in a media access control (MAC) entity ServCellIndex is less than 8, a beam failure recovery (BFR) media access control (MAC) control element (CE) of a first format is used, and in a case where the highest serving cell index of the secondary cell where a beam failure is reported in a media access control (MAC) entity ServCellIndex is greater than or equal to 8, a beam failure recovery (BFR) media access control (MAC) control element (CE) of a second format is used by a terminal equipment.

For example, for BFR MAC CE, it is assumed that a beam failure is detected in secondary cells with ServCellIndex=2 and ServCellIndex=10, but in the embodiments of the present disclosure, a beam failure in a secondary cell with ServCellIndex=10 is not reported. In this case, a highest serving cell index that reports a beam failure in a secondary cell ServCellIndex=2 which is less than 8, Format 1 as shown in FIG. 2 is used, that is, BFR MAC CE of a 1-byte bitmap.

For another example, in a case where a highest serving cell index of a secondary cell where reports a beam failure in a media access control (MAC) entity ServCellIndex is less than 8, or reports a beam failure in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, a beam failure in a secondary cell with ServCellIndex=10 is not reported. In this case, a highest serving cell index that reports a beam failure in a secondary cell ServCellIndex=2 which is less than 8, Format 1 as shown in FIG. 2 is used, that is, Truncated BFR MAC CE of a 1-byte bitmap.

For another example, in a case where a highest serving cell index of a secondary cell where it reports a beam failure in a media access control (MAC) entity ServCellIndex is less than 8, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by the terminal equipment; otherwise, a truncated beam failure recovery (BFR) media access control (MAC) control element (CE) of a second format is used by the terminal equipment.

In some embodiments, use of Format 1 or Format 2 is determined according to a highest serving cell index ServCellIndex of a secondary cell where a beam failure is detected and reported in this MAC entity. Thereby, signaling overhead can be reduced.

For example, in a case where a highest serving cell index that is less than 8 of a secondary cell where it detects a beam failure and reports the beam failure in a media access control (MAC) entity, a beam failure recovery (BFR) media access control (MAC) control element (CE) of a first format is used by a terminal equipment, and in a case where the highest serving cell index of the secondary cell where a beam failure is detected and reported in a media access control (MAC) entity is greater than or equal to 8, a beam failure recovery (BFR) media access control (MAC) control element (CE) of a second format is used by a terminal equipment.

For example, for BFR MAC CE, it is assumed that a beam failure is detected in secondary cells with ServCellIndex=2 and ServCellIndex=10, but in the embodiments of the present disclosure, a beam failure in a secondary cell with ServCellIndex=10 is not reported. In this case, a highest serving cell index that detects a beam failure and reports the beam failure in a secondary cell ServCellIndex=2 which is less than 8, Format 1 as shown in FIG. 2 is used, that is, BFR MAC CE of a 1-byte bitmap.

For another example, in a case where a highest serving cell index that is less than 8 of a secondary cell where it detects a beam failure and reports a beam failure in a media access control (MAC) entity, or a beam failure is detected in a special cell, the beam failure is reported and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, a beam failure in a secondary cell with ServCellIndex=10 is not reported. In this case, a highest serving cell index that detects a beam failure and reports the beam failure in a secondary cell ServCellIndex=2 which is less than 8, Format 1 as shown in FIG. 2 is used, that is, Truncated BFR MAC CE of a 1-byte bitmap.

For another example, in a case where a highest serving cell index that is less than 8 of a secondary cell where it detects a beam failure and reports the beam failure in a media access control (MAC) entity, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

In some embodiments, use of Format 1 or Format 2 is determined according to a highest serving cell index ServCellIndex of a secondary cell where a beam failure is detected in this MAC entity and the candidate beam detection based on a synchronization signal block or a channel state information reference signal has been completed. Thereby, signaling overhead can be reduced.

For example, in a case where a highest serving cell index that is less than 8 of a secondary cell where it detects a beam failure in a media access control (MAC) entity and the candidate beam detection based on a synchronization signal block or a channel state information reference signal has been completed, a beam failure recovery (BFR) media access control (MAC) control element (CE) of a first format is used by a terminal equipment.

In a case where a highest serving cell index that is greater than or equal to 8 of a secondary cell where a beam failure is detected in a media access control (MAC) entity and the candidate beam detection based on a synchronization signal block or a channel state information reference signal has been completed, a beam failure recovery (BFR) media access control (MAC) control element (CE) of a second format is used.

For example, for BFR MAC CE, it is assumed that a beam failure is detected in secondary cells with ServCellIndex=2 and ServCellIndex=10, but in the embodiments of the present disclosure, for ServCellIndex=10, the candidate beam detection based on a synchronization signal block or a channel state information reference signal has not been completed yet. In this case, a highest serving cell index of a secondary cell where a beam failure is detected and the candidate beam detection based on a synchronization signal block or a channel state information reference signal has been completed ServCellIndex=2 which is less than 8, Format 1 as shown in FIG. 2 is used, that is, BFR MAC CE of a 1-byte bitmap.

For another example, in a case where a highest serving cell index that is less than 8 of a secondary cell where it detects a beam failure in a media access control (MAC) entity and the candidate beam detection based on a synchronization signal block or a channel state information reference signal has been completed, or a beam failure is detected in a special cell and the candidate beam detection based on a synchronization signal block or a channel state information reference signal has been completed and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, for ServCellIndex=10, the candidate beam detection based on a synchronization signal block or a channel state information reference signal has not been completed yet. In this case, a highest serving cell index of a secondary cell where a beam failure is detected and the candidate beam detection based on a synchronization signal block or a channel state information reference signal has been completed ServCellIndex=2 which is less than 8, Format 1 as shown in FIG. 2 is used, that is, Truncated BFR MAC CE of a 1-byte bitmap.

For another example, in a case where a highest serving cell index that is less than 8 of a secondary cell where it detects a beam failure in a media access control (MAC) entity and the candidate beam detection based on a synchronization signal block or a channel state information reference signal has been completed, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

In some embodiments, use of Format 1 or Format 2 is determined according to a highest serving cell index ServCellIndex of a secondary cell where a beam failure is detected in this MAC entity and candidate beam identifiers are determined or it is determined that there are not candidate beams. Thereby, signaling overhead can be reduced.

For example, in a case where a highest serving cell index that is less than 8 of a secondary cell where it detects a beam failure in a media access control (MAC) entity and candidate beam identifiers are determined or it is determined that there are not candidate beams, a beam failure recovery (BFR) media access control (MAC) control element (CE) of a first format is used by a terminal equipment.

In a case where a highest serving cell index that is greater than or equal to 8 of a secondary cell where a beam failure is detected in a media access control (MAC) entity and candidate beam identifiers are determined or it is determined that there are no candidate beams, a beam failure recovery (BFR) media access control (MAC) control element (CE) of a second format is used.

For example, for BFR MAC CE, it is assumed that a beam failure is detected in secondary cells with ServCellIndex=2 and ServCellIndex=10, but in the embodiments of the present disclosure, a secondary cell with ServCellIndex=10 has not determined candidate beam identifiers yet and has not determined that there are not candidate beams yet. In this case, a highest serving cell index of a secondary cell where a beam failure is detected and candidate beam identifiers are determined or it is determined that there are no candidate beams ServCellIndex=2 which is less than 8, Format 1 as shown in FIG. 2 is used, that is, BFR MAC CE of a 1-byte bitmap.

For another example, in a case where a highest serving cell index that is less than 8 of a secondary cell where it detects a beam failure in a media access control (MAC) entity and candidate beam identifiers are determined or it is determined that there are not candidate beams, or a beam failure is detected in a special cell, candidate beam identifiers are determined or it is determined that there are no candidate beams and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, a secondary cell with ServCellIndex=10 has not determined candidate beam identifiers yet and has not determined that there are not candidate beams yet. In this case, a highest serving cell index of a secondary cell where a beam failure is detected and candidate beam identifiers are determined or it is determined that there are not candidate beams ServCellIndex=2 which is less than 8, Format 1 as shown in FIG. 2 is used, that is, Truncated BFR MAC CE of a 1-byte bitmap.

For another example, in a case where a highest serving cell index that is less than 8 of a secondary cell where it detects a beam failure in a media access control (MAC) entity and candidate beam identifiers are determined or it is determined that there are not candidate beams, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

In some embodiments, use of Format 1 or Format 2 is determined according to a highest serving cell index ServCellIndex of a secondary cell where a beam failure is detected in this MAC entity and which is not during an evaluation period of the candidate beam detection based on a synchronization signal block or a channel state information reference signal. Thereby, signaling overhead can be reduced.

For example, in a case where a highest serving cell index that is less than 8 of a secondary cell where it detects a beam failure in a media access control (MAC) entity and which is not during an evaluation period of the candidate beam detection based on a synchronization signal block or a channel state information reference signal, a beam failure recovery (BFR) media access control (MAC) control element (CE) of a first format is used by a terminal equipment.

In a case where a highest serving cell index that is greater than or equal to 8 of a secondary cell where a beam failure is detected in a media access control (MAC) entity and which is not during an evaluation period of the candidate beam detection based on a synchronization signal block or a channel state information reference signal, a beam failure recovery (BFR) media access control (MAC) control element (CE) of a second format is used.

For example, for BFR MAC CE, it is assumed that a beam failure is detected in secondary cells with ServCellIndex=2 and ServCellIndex=10, but in the embodiments of the present disclosure, a secondary cell with ServCellIndex=10 is during an evaluation period of the candidate beam detectionbased on a synchronization signal block or a channel state information reference signal. In this case, a highest serving cell index of a secondary cell where a beam failure is detected and which is not during an evaluation period of the candidate beam detection based on a synchronization signal block or a channel state information reference signal ServCellIndex=2 which is less than 8, Format 1 as shown in FIG. 2 is used, that is, BFR MAC CE of a 1-byte bitmap.

For another example, in a case where a highest serving cell index that is less than 8 of a secondary cell where it detects a beam failure in a media access control (MAC) entity and which is not during an evaluation period of the candidate beam detection based on a synchronization signal block or a channel state information reference signal, or a beam failure is detected in a special cell, and not during an evaluation period of the candidate beam detection based on a synchronization signal block or a channel state information reference signal and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, a secondary cell with ServCellIndex=10 is during an evaluation period of the candidate beam detection based on a synchronization signal block or a channel state information reference signal. In this case, a highest serving cell index of a secondary cell where a beam failure is detected and which is not during an evaluation period of the candidate beam detection based on a synchronization signal block or a channel state information reference signal ServCellIndex=2 which is less than 8, Format 1 as shown in FIG. 2 is used, that is, Truncated BFR MAC CE of a 1-byte bitmap.

For another example, in a case where a highest serving cell index that is less than 8 of a secondary cell where it detects a beam failure in a media access control (MAC) entity and which is not during an evaluation period of the candidate beam detection based on a synchronization signal block or a channel state information reference signal, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

In some embodiments, use of Format 1 or Format 2 is determined according to a highest serving cell index ServCellIndex of a secondary cell where it is considered that a beam failure is detected in this MAC entity. Thereby, signaling overhead can be reduced.

For example, in a case where a highest serving cell index that is less than 8 of a secondary cell where it is considered that a beam failure is detected in a media access control (MAC) entity, a beam failure recovery (BFR) media access control (MAC) control element (CE) of a first format is used by a terminal equipment.

In a case where a highest serving cell index that is greater than or equal to 8 of a secondary cell where it is considered that a beam failure is detected in a media access control (MAC) entity, a beam failure recovery (BFR) media access control (MAC) control element (CE) of a second format is used.

For example, for BFR MAC CE, it is assumed that a beam failure is detected in secondary cells with ServCellIndex=2 and ServCellIndex=10, but in the embodiments of the present disclosure, it is not considered that a beam failure is detected in a secondary cell with ServCellIndex=10, or it is considered that a beam failure is not detected in a secondary cell with ServCellIndex=10. In this case, a highest serving cell index of a secondary cell where a beam failure is detected ServCellIndex=2 which is less than 8, Format 1 as shown in FIG. 2 is used, that is, BFR MAC CE of a 1-byte bitmap.

For another example, in a case where a highest serving cell index that is less than 8 of a secondary cell where it is considered a beam failure is detected in a media access control (MAC) entity, or it is considered that a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

For example, for Truncated BFR MAC CE, it is assumed that a beam failure is detected in secondary cells with ServCellIndex=2 and ServCellIndex=10, but in the embodiments of the present disclosure, it is not considered that a beam failure is detected in a secondary cell with ServCellIndex=10, or it is considered that a beam failure is not detected in a secondary cell with ServCellIndex=10. In this case, a highest serving cell index of a secondary cell where it is considered that a beam failure is detected ServCellIndex=2 which is less than 8, Format 1 as shown in FIG. 2 is used, that is, Truncated BFR MAC CE of a 1-byte bitmap.

For another example, in a case where a highest serving cell index that is less than 8 of a secondary cell where it is considered a beam failure is detected in a media access control (MAC) entity, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

In some embodiments, when a terminal equipment transmits a media access control (MAC) protocol data unit (PDU) including secondary cell beam failure information, beam failure recovery having been triggered on the secondary cell before the media access control (MAC) protocol data unit (PDU) is assembled is not cancelled.

For example, when a MAC PDU is transmitted and the PDU includes a BFR MAC CE or Truncated BFR MAC CE, wherein the MAC CE includes beam failure information of a secondary cell, all BFRs of the secondary cell triggered for beam failure recovery before the MAC PDU is assembled should be cancelled.

For another example, if BFRs are triggered on a secondary cell for beam failure recovery, a MAC entity may not report that a beam failure has occurred in the secondary cell; when a terminal equipment transmits a MAC PDU and the PDU includes a BFR MAC CE or Truncated BFR MAC CE including beam failure information of the secondary cell, BFRs which have been triggered on the secondary cell before the MAC PDU is assembled are cancelled, except that the MAC entity does not report the BFRs which have been triggered on the secondary cell where a beam failure has occurred.

For example, before the candidate beam detection based on a SSB/CSI-RS is completed in a cell, or before candidate RS IDs of a cell from a lower layer are received, or during an evaluation period of the candidate beam detection based on a SSB/CSI-RS in a cell, or if a lower layer is performing the candidate beam detection based on a SSB/CSI-RS in a cell, or if a lower layer has not completed the candidate beam detection based on a SSB/CSI-RS in a cell yet, or before end of an evaluation period of the candidate beam detection based on a SSB/CSI-RS in a cell, if a MAC entity of a terminal equipment has instructed a multiplexing and assembly procedure to generate a MAC PDU and the MAC PDU includes a BFR MAC CE or Truncated BFR MAC CE, the MAC entity does not report a beam failure occurs in this cell, in the BFR MAC CE or Truncated BFR MAC CE of the MAC PDU. Moreover, when the MAC PDU is transmitted, BFRs which have been triggered on the cell before the MAC PDU is assembled are not cancelled.

For example, a terminal is configured with a secondary cell 1 and a secondary cell 2, both of which trigger a BFR. When a MAC PDU is transmitted and the PDU includes a BFR MAC CE, the BFR MAC CE includes beam failure information of the secondary cell 1 and the secondary cell 2, all BFRs triggered on the secondary cell 1 and the secondary cell 2 are cancelled; or, a terminal is configured with a secondary cell 1 and a secondary cell 2, both of which trigger a BFR. When a MAC PDU is transmitted and the PDU includes a BFR MAC CE, and the BFR MAC CE includes beam failure information of the secondary cell 1 but does not report a beam failure occurs in the secondary cell 2, all BFRs triggered on the secondary cell 1 are cancelled, but all BFRs triggered on the secondary cell 2 are not cancelled.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, in a case where a terminal equipment determines that it has completed candidate beam detection based on a synchronization signal block (SSB) or a channel state information reference signal (CSI-RS) in a secondary cell in which a beam failure occurs, the terminal equipment reports to a network device that a beam failure occurs in the secondary cell. Thereby, the network device will not configure an inappropriate beam for the terminal equipment, so as to reduce or avoid situations that the beam failure can't be recovered.

Embodiments of a Second Aspect

The embodiments of the present disclosure provide a method for reporting beam failure information, which will be described from a terminal equipment. The contents same as the embodiments of the first aspect are not repeated.

Figure 7:
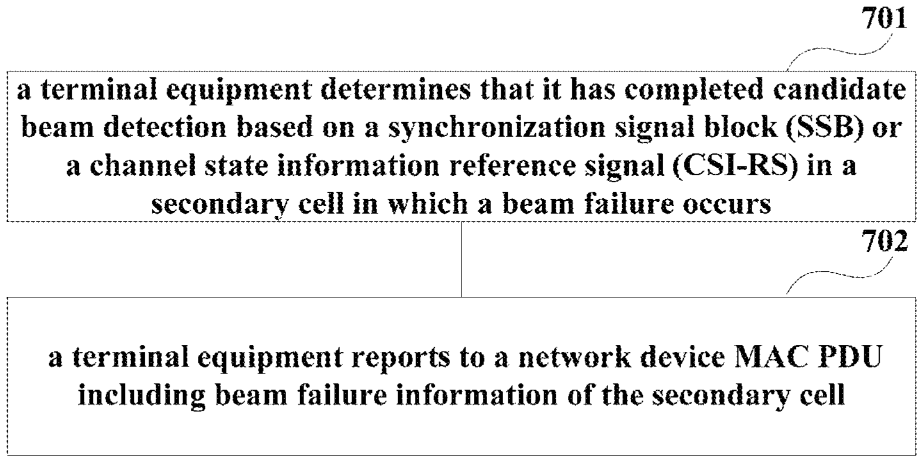
FIG. 7 is another schematic diagram of a method for reporting beam failure information in the embodiments of the present disclosure.

FIG. 7 is a schematic diagram of a method for reporting beam failure information in the embodiments of the present disclosure, as shown in FIG. 7, the method includes:

701, a terminal equipment determines that it has completed candidate beam detection based on a synchronization signal block (SSB) or a channel state information reference signal (CSI-RS) in a secondary cell in which a beam failure occurs; and

702, a terminal equipment reports to a network device a media access control (MAC) protocol data unit (PDU) including beam failure information of the secondary cell.

It should be noted that the above FIG. 7 is only schematic description of the embodiments of the present disclosure, but the present disclosure is not limited to this. For example, an execution step of each operation can be adjusted appropriately, moreover other some operations can be increased or reduced. Persons skilled in the art can make appropriate modifications according to the above contents, not limited to the records in the above FIG. 7.

In some embodiments, a terminal equipment determines that it has completed candidate beam detection based on a synchronization signal block (SSB) or a channel state information reference signal (CSI-RS) in a secondary cell in which a beam failure occurs in 701 includes: a media access control (MAC) entity of the terminal equipment determines that the candidate beam detection based on a synchronization signal block or a channel state information reference signal has been completed in the secondary cell, and/or, the media access control (MAC) entity of the terminal equipment receives one or more candidate beam identifiers of the secondary cell from a lower layer.

In some embodiments, before a terminal equipment determines that the candidate beam detection based on a synchronization signal block or a channel state information reference signal has been completed in the secondary cell, or before one or more candidate beam identifiers of the secondary cell from a lower layer are received, or it is determined it is during an evaluation period of the candidate beam detection based on a synchronization signal block or a channel state information reference signal in the secondary cell, a media access control (MAC) entity of the terminal equipment does not instruct a multiplexing and assembly procedure to generate a MAC CE carrying beam failure and recovery information of a secondary cell. The MAC CE includes a beam failure recovery (BFR) media access control (MAC) control element (CE) or a truncated beam failure recovery (BFR) media access control (MAC) control element (CE).

For example, BFR MAC CE or Truncated MAC CE may use Format 1 (as shown in FIG. 2), or may use Format 2 (as shown in FIG. 3). For the detailed contents of BFR MAC CE or Truncated MAC CE, the embodiments of the first aspect can be referred to.

Thereby, the network device does not know that a beam failure occurs in the cell, so it does not perform beam management for the cell and configure an inappropriate beam for the cell. Instead, it waits for a subsequent failure indication carrying candidate beam information (RS ID) and performs reconfiguration based on this information.

In some embodiments, the media access control (MAC) entity of the terminal equipment does not instruct a multiplexing and assembly procedure to generate a beam failure recovery (BFR) media access control (MAC) control element (CE) or a truncated beam failure recovery (BFR) media access control (MAC) control element (CE), which includes:

In a case where the media access control (MAC) entity determines that the secondary cell has triggered beam failure recovery and has not canceled, that there is an available uplink resource and that the uplink resource can accommodate a beam failure recovery (BFR) media access control (MAC) control element (CE) or a truncated beam failure recovery (BFR) media access control (MAC) control element (CE), the media access control (MAC) entity does not instruct the multiplexing and assembly procedure to generate the beam failure recovery (BFR) media access control (MAC) control element (CE) or the truncated beam failure recovery (BFR) media access control (MAC) control element (CE).

In some embodiments, in a case where in a beam failure recovery procedure, it is determined that at least one piece of beam failure recovery is triggered and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity (MAC) instructs the multiplexing and assembly procedure to generate a beam failure recovery (BFR) media access control (MAC) control element (CE) or a truncated beam failure recovery (BFR) media access control (MAC) control element (CE), or triggers a scheduling request (SR).

For example, for how to generate BFR MAC CE, Table 7 may be referred to:

TABLE 7

| |
|---|
| The MAC entity shall: |
| 1>if the Beam Failure Recovery procedure determines that at least one BFR has been triggered and not cancelled; and |
| 1> if SSB/CSI-RS based candidate beam detection completes for at least one serving cell for which at least one BFR has been triggered and not cancelled; |
| 2> if UL-SCH resources are available for a new transmission and if the UL-SCH resources can accommodate the BFR MAC CE plus its subheader as a result of LCP: |
| 3> instruct the Multiplexing and Assembly procedure to generate the BFR MAC CE. |
| 2> else if UL-SCH resources are available for a new transmission and if the UL-SCH resources can accommodate the Truncated BFR MAC CE plus its subheader as a result of LCP: |
| 3> instruct the Multiplexing and Assembly procedure to generate the Truncated BFR MAC CE. |
| 2> else: |
| 3> trigger the SR for SCell beam failure recovery for each SCell for which BFR has been triggered and not cancelled. |

In some embodiments, in a case where in a beam failure recovery procedure, it is determined that beam failure recovery on at least one secondary cell is triggered and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity (MAC) instructs the multiplexing and assembly procedure to generate a beam failure recovery (BFR) media access control (MAC) control element (CE) or a truncated beam failure recovery (BFR) media access control (MAC) control element (CE), or triggers a scheduling request (SR).

For example, for how to generate BFR MAC CE, Table 8 may be referred to:

TABLE 8

| |
|---|
| The MAC entity shall: |
| 1> if the Beam Failure Recovery procedure determines that at least one BFR has been triggered and not cancelled: |
| 2> if SSB/CSI-RS based candidate beam detection completes for at least one serving cell for which at least one BFR has been triggered and not cancelled: |
| 3> if UL-SCH resources are available for a new transmission and if the UL-SCH resources can accommodate the BFR MAC CE plus its subheader as a result of LCP: |

TABLE 8-continued

| |
|---|
| 4> instruct the Multiplexing and Assembly procedure to generate the BFR MAC CE. |
| 3> else if UL-SCH resources are available for a new transmission and if the UL-SCH resources can accommodate the Truncated BFR MAC CE plus its subheader as a result of LCP: |
| 4> instruct the Multiplexing and Assembly procedure to generate the Truncated BFR MAC CE. |
| 3> else: |
| 4> trigger the SR for SCell beam failure recovery for each SCell for which BFR has been triggered and not cancelled. |

In some embodiments, when a terminal equipment transmits a media access control (MAC) protocol data unit (PDU) including secondary cell beam failure information, beam failure recovery having been triggered on the secondary cell before the media access control (MAC) protocol data unit (PDU) is assembled is not cancelled.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, in a case where a terminal equipment determines that it has completed candidate beam detection based on a synchronization signal block (SSB) or a channel state information reference signal (CSI-RS) in a secondary cell in which a beam failure occurs, the terminal equipment transmits to a network device a media access control (MAC) protocol data unit (PDU) including beam failure information of the secondary cell. Thereby, the network device will not configure an inappropriate beam for the terminal equipment, so as to reduce or avoid situations that the beam failure can't be recovered.

Embodiments of a Third Aspect

The following is further described based on the embodiments of the first and second aspects, the contents same as the embodiments of the first and second aspects are not repeated. Moreover, the embodiments of the third aspect can be implemented in combination with the embodiments of the first and second aspects, or can be implemented separately.

In some embodiments, a terminal equipment detects a beam failure occurs in a secondary cell; before it is determined that candidate beam detection based on a synchronization signal block or a channel state information reference signal has been completed in the secondary cell, or before one or more candidate beam identifiers of the secondary cell are received, or it is determined that it is during an evaluation period of the candidate beam detection beams based on a synchronization signal block or a channel state information reference signal in the secondary cell, the terminal equipment does not report that a beam failure occurs in the secondary cell, and/or, the terminal equipment does not instruct a multiplexing and assembly procedure to generate a beam failure recovery (BFR) media access control (MAC) control element (CE) or a truncated beam failure recovery (BFR) media access control (MAC) control element (CE).

For example, when only one cell triggers a BFR, before candidate beam detection based on a SSB or a CSI-RS has been completed in the cell, the MAC entity will not instruct a multiplexing and assembly procedure to generate (Truncated) BFR MAC CE, thereby signaling can be further saved.

In some embodiments, the embodiments of the first and second aspects can be combined.

For example, in a case where beam failure recovery is triggered in multiple cells and candidate beam detection has been completed in at least one cell, the terminal equipment does not report that a beam failure occurs in the second cell, i.e., the embodiments of the first aspect can be implemented.

In a case where beam failure recovery is triggered in multiple cells and candidate beam detection has not been completed in all cells in which beam failure recovery is triggered, the terminal equipment does not instruct a multiplexing and assembly procedure to generate a beam failure recovery (BFR) media access control (MAC) control element (CE) or a truncated beam failure recovery (BFR) media access control (MAC) control element (CE), i.e., the embodiments of the second aspect can be implemented.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, before candidate beam detection based on a synchronization signal block or a channel state information reference signal has been completed in the secondary cell, or before one or more candidate beam identifiers of the secondary cell are received, or it is determined that it is during an evaluation period of the candidate beam detection based on a synchronization signal block or a channel state information reference signal in the secondary cell, the terminal equipment does not report that a beam failure occurs in the secondary cell, and/or, does not instruct a multiplexing and assembly procedure to generate BFR MAC CE or truncated BFR MAC CE. Thereby, the network device will not configure an inappropriate beam for the terminal equipment, so as to reduce or avoid situations that the beam failure can't be recovered.

Embodiments of a Fourth Aspect

The following is further described based on the embodiments of the first to third aspects, the contents same as the embodiments of the first to third aspects are not repeated. Moreover, the embodiments of the fourth aspect can be implemented in combination with the embodiments of the first to third aspects, or can be implemented separately.

In some embodiments, in a case where the secondary cell is configured on the media access control (MAC) entity, the media access control (MAC) entity of a terminal equipment generates a beam failure recovery (BFR) media access control (MAC) control element (CE) or a truncated beam failure recovery (BFR) media access control (MAC) control element (CE) for the media access control (MAC) entity.

In some embodiments, indication information (Ci field) of the beam failure recovery (BFR) media access control (MAC) control element (CE) is set to be 1, which indicates that a beam failure is detected in a secondary cell of a serving cell with an index i configured on the media access control (MAC) entity and candidate beam information is included.

Indication information (Ci field) of the beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

For example, for BFR MAC CE, the meaning of the Ci field may be explained as shown in Table 9:

TABLE 9

| |
|---|
| $C_i$ (BFR MAC CE): This field indicates beam failure detection (as specified in clause 5.17) and the presence of an octet containing the AC field for the SCell with ServCellIndex i as specified in TS 38.331 [5]. The $C_i$ field set to 1 indicates that beam failure is detected and the octet containing the AC field is present for the SCell configured for the MAC entity with ServCellIndex i. The $C_i$ field set to 0 indicates that there is no an SCell configured for the MAC entity with ServCellIndex i or that the beam failure is not detected and octet containing the AC field is not present for the SCell configured for the MAC entity with ServCellIndex i. The octets containing the AC field are present in ascending order based on the ServCellIndex. |

In some embodiments, indication information (Ci field) of the truncated beam failure recovery (BFR) media access control (MAC) control element (CE) is set to be 1, which indicates that a beam failure is detected in a secondary cell of a serving cell with an index i configured on the media access control (MAC) entity and candidate beam information is included.

Indication information (Ci field) of the truncated beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

For example, for Truncated BFR MAC CE, the meaning of the Ci field may be explained as shown in Table 10:

TABLE 10

| |
|---|
| $C_i$ (Truncated BFR MAC CE): This field indicates beam failure detection (as specified in clause 5.17) for the SCell with ServCellIndex i as specified in TS 38.331 [5]. The $C_i$ field set to 1 indicates that beam failure is detected and the octet containing the AC field for the SCell configured for the MAC entity configured for the MAC entity with ServCellIndex i may be present. The $C_i$ field set to 0 indicates that there is no an SCell configured for the MAC entity with ServCellIndex i or that the beam failure is not detected and the octet containing the AC field is not present for the SCell configured for the MAC entity with ServCellIndex i. The octets containing the AC field, if present, are included in ascending order based on the ServCellIndex. The number of octets containing the AC field included is maximised, while not exceeding the available grant size. |

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, in a case where a secondary cell is configured in a MAC entity, the MAC entity of the terminal equipment generates BFR MAC CE or truncated BFR MAC CE for the MAC. Thereby, only when a secondary cell is configured in the MAC entity, its Ci field is set to 1, which can further save bits of the MAC CE.

Embodiments of a Fifth Aspect

The embodiments of the present disclosure provide an apparatus for reporting beam failure information. The apparatus may, for example, be a terminal equipment, or it may be one or more parts or components configured on the terminal equipment. The contents same as the embodiments of the first to fifth aspects are not repeated.

Figure 8:
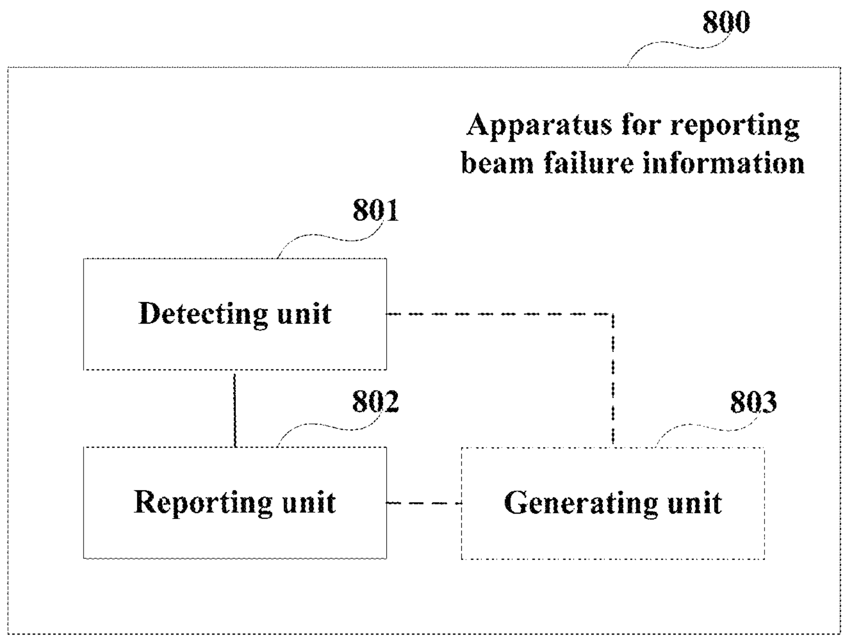
FIG. 8 is a schematic diagram of an apparatus for reporting beam failure information in the embodiments of the present disclosure.

FIG. 8 is a schematic diagram of an apparatus for reporting beam failure information in the embodiments of the present disclosure, as shown in FIG. 8, the apparatus 800 for reporting beam failure information includes:

- a detecting unit 801 configured to detect one or more candidate beams; and
- a reporting unit 802 configured to report a beam failure in a secondary cell in which candidate beam detection based on a synchronization signal block or a channel state information reference signal has been completed.

In some embodiments, the reporting unit 802 is further configured to: determine by a media access control entity that the candidate beam detection based on a synchronization signal block or a channel state information reference signal has been completed in the secondary cell, and/or, receive one or more candidate beam identifiers of the secondary cell by the media access control entity from a lower layer.

In some embodiments, the reporting unit 802 is further configured to: before the candidate beam detection based on a synchronization signal block or a channel state information reference signal has been completed in the secondary cell, or before one or more candidate beam identifiers of the secondary cell from a lower layer are received, or during an evaluation period of the candidate beam detection based on a synchronization signal block or a channel state information reference signal in the secondary cell, not to report by the media access control entity that a beam failure occurs in the secondary cell.

In some embodiments, as shown in FIG. 8, the apparatus 800 for reporting beam failure information includes:

a generating unit 803 configured to, in a case where the secondary cell has triggered beam failure recovery and the beam failure recovery is not cancelled, generate a corresponding media access control control element or a truncated media access control control element and assembly a media access control protocol data unit; and the media access control entity does not report in the media access control control element or the truncated media access control control element that a beam failure occurs in the secondary cell.

In some embodiment, the media access control entity sets indication information to which the secondary cell corresponds to be 0 in the media access control control element or the truncated media access control control element, and does not include a field carrying candidate beam information to which the secondary cell corresponds.

In some embodiments, the media access control entity instructs a multiplexing and assembly procedure to generate a beam failure recovery media access control control element, and a beam failure recovery media access control control element or a truncated beam failure recovery media access control control element is generated in the multiplexing and assembly procedure; or the media access control entity instructs a multiplexing and assembly procedure to generate a truncated beam failure recovery media access control control element, and a beam failure recovery media access control control element or a truncated beam failure recovery media access control control element is generated in the multiplexing and assembly procedure.

In some embodiments, the media access control entity instructs a multiplexing and assembly procedure to generate a beam failure recovery media access control control element carrying beam failure and recovery information of a secondary cell, and a beam failure recovery media access control control element or a truncated beam failure recovery media access control control element is generated in the multiplexing and assembly procedure;

and in the multiplexing and assembly procedure, it is determined whether the beam failure recovery media access control control element or the truncated beam failure recovery media access control control element is generated.

In some embodiments, the media access control entity instructs a multiplexing and assembly procedure to generate a beam failure recovery media access control control element, and once the instruction of the media access control entity is received, the beam failure recovery media access control control element is generated in the multiplexing and assembly procedure; or the media access control entity instructs a multiplexing and assembly procedure to generate a truncated beam failure recovery media access control control element, and once the instruction of the media access control entity is received, the truncated beam failure recovery media access control control element is generated in the multiplexing and assembly procedure.

In some embodiments, in a case where a highest serving cell index that is less than 8 with indication information to which a secondary cell in a media access control entity corresponds set to be 1, a beam failure recovery media access control control element of a first format is used, and in a case where the highest serving cell index that is greater than or equal to 8 with indication information set to be 1, a beam failure recovery media access control control element of a second format is used.

In some embodiments, wherein in a case where a highest serving cell index that is less than 8 with indication information to which a secondary cell in a media access control entity corresponds set to be 1, or a beam failure is detected in a special cell and the special cell is to be included in a truncated beam failure recovery media access control control element and an uplink resource is unable to accommodate a truncated beam failure recovery media access control control element of a second format, a truncated beam failure recovery media access control control element of a first format is used; otherwise, a truncated beam failure recovery media access control control element of a second format is used.

In some embodiments, in transmitting a media access control protocol data unit including secondary cell beam failure information, beam failure recovery having been triggered on the secondary cell before the media access control protocol data unit is assembled is not cancelled.

In some embodiments, in a case where the secondary cell is configured on the media access control entity, the media access control entity generates a beam failure recovery media access control control element or a truncated beam failure recovery media access control control element for the media access control entity.

In some embodiments, indication information of the beam failure recovery media access control control element is set to be 1 indicates that a beam failure is detected in a secondary cell of a serving cell with an index i configured on the media access control entity and candidate beam information is included; that indication information of the beam failure recovery media access control control element is set to be 0 indicates that a secondary cell of a serving cell with an index i is not configured on the media access control entity, or a beam failure is not detected in the secondary cell and candidate beam information is not included;

indication information of the truncated beam failure recovery media access control control element is set to be 1 indicates that a beam failure is detected in a secondary cell of a serving cell with an index i configured on the media access control entity and candidate beam information is included; that indication information of the truncated beam failure recovery media access control control element is set to be 0 indicates that a secondary cell of a serving cell with an index i is not configured on the media access control entity, or a beam failure is not detected in the secondary cell and candidate beam information is not included.

In some embodiments, the reporting unit 802 is configured to report to a network device a media access control protocol data unit including beam failure information on a secondary cell in which candidate beam detection based on a synchronization signal block or a channel state information reference signal has been completed.

In some embodiments, the reporting unit 802 is further configured to: determine by a media access control entity that the candidate beam detection based on a synchronization signal block or a channel state information reference signal has been completed in the secondary cell, or receive one or more candidate beam identifiers of the secondary cell by the media access control entity from a lower layer.

In some embodiments, it is determined that before the candidate beam detection based on a synchronization signal block or a channel state information reference signal has been completed in the secondary cell, or before one or more candidate beam identifiers of the secondary cell from a lower layer are received, or it is determined it is during an evaluation period of the candidate beam detection based on a synchronization signal block or a channel state information reference signal in the secondary cell, the media access control entity does not instruct a multiplexing and assembly procedure to generate a beam failure recovery media access control control element or a truncated beam failure recovery media access control control element.

In some embodiments, in a case where in a beam failure recovery procedure, it is determined that at least one piece of beam failure recovery is triggered and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity instructs the multiplexing and assembly procedure to generate a beam failure recovery media access control control element or a truncated beam failure recovery media access control control element, or triggers a scheduling request.

In some embodiments, in a case where in a beam failure recovery procedure, it is determined that a beam failure recovery is triggered on at least one secondary cell and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity instructs the multiplexing and assembly procedure to generate a beam failure recovery media access control control element or a truncated beam failure recovery media access control control element, or triggers a scheduling request.

Figure 9:
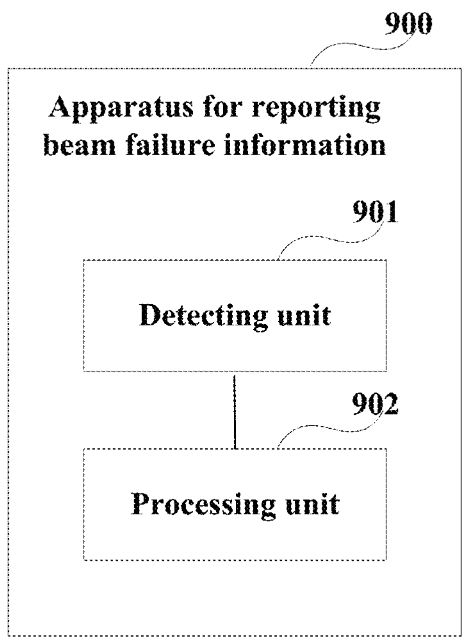
FIG. 9 is another schematic diagram of an apparatus for reporting beam failure information in the embodiments of the present disclosure.

FIG. 9 is another schematic diagram of an apparatus for reporting beam failure information in the embodiments of the present disclosure, as shown in FIG. 9, the apparatus 900 for reporting beam failure information includes:

- a detecting unit 901 configured to detect that a beam failure occurs in a secondary cell; and
- a processing unit 902 configured to, before candidate beam detection based on a synchronization signal block or a channel state information reference signal has been completed in the secondary cell, or before one or more candidate beam identifiers of the secondary cell are received, or during an evaluation period of the candidate beam detection based on a synchronization signal block or a channel state information reference signal in the secondary cell, not to report that a beam failure occurs in the secondary cell, or, not to instruct a multiplexing and assembly process to generate a beam failure recovery media access control control element or a truncated beam failure recovery media access control control element.

In some embodiments, in a case where beam failure recovery is triggered in multiple cells and candidate beam detection has been completed in at least one cell, the processing unit 902 does not report that a beam failure occurs in the second cell;

- in a case where beam failure recovery is triggered in multiple cells and candidate beam detection has not been completed in all cells in which beam failure recovery is triggered, the processing unit 902 does not instruct a multiplexing and assembly procedure to generate a beam failure recovery media access control control element or a truncated beam failure recovery media access control control element.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

It's worth noting that the above only describes components or modules related to the present disclosure, but the present disclosure is not limited to this. The apparatuses 800, 900 for reporting beam failure information may further include other components or modules. For detailed contents of these components or modules, relevant technologies can be referred to.

Moreover, for the sake of simplicity, FIG. 8 and FIG. 9 only demonstratively show a connection relationship or signal direction between components or modules, however persons skilled in the art should know that various relevant technologies such as bus connection can be used. The above components or modules can be realized by a hardware facility such as a processor, a memory, a transmitter, a receiver, etc. The embodiments of the present disclosure have no limitation to this.

As can be known from the above embodiments, in a case where a secondary cell in which a beam failure occurs has completed candidate beam detection based on a synchronization signal block (SSB) or a channel state information reference signal (CSI-RS), a terminal equipment reports to a network device that a beam failure occurs in the secondary cell, or transmits to a network device a media access control (MAC) protocol data unit (PDU) including beam failure information of a secondary cell. Thereby, the network device will not configure an inappropriate beam for the terminal equipment, so as to reduce or avoid situations that the beam failure can't be recovered.

Embodiments of a Sixth Aspect

The embodiments of the present disclosure further provide a communication system, FIG. 1 can be referred to, the contents same as the embodiments of the first to fifth aspects are not repeated.

In some embodiments, the communication system may include:

- a terminal equipment 102 configured to determine that it has completed candidate beam detection based on a synchronization signal block (SSB) or a channel state information reference signal (CSI-RS) in a secondary cell in which a beam failure occurs; and report that a beam failure occurs in the secondary cell, or report a media access control (MAC) protocol data unit (PDU) including beam failure information of a secondary cell;
- a network device 101 configured to receive reporting information in which the beam failure occurs in the secondary cell, or a media access control (MAC) protocol data unit (PDU) including beam failure information of the secondary cell.

The embodiments of the present disclosure further provide a network device, for example may be a base station, but the present disclosure is not limited to this, it may also be other network device.

Figure 10:
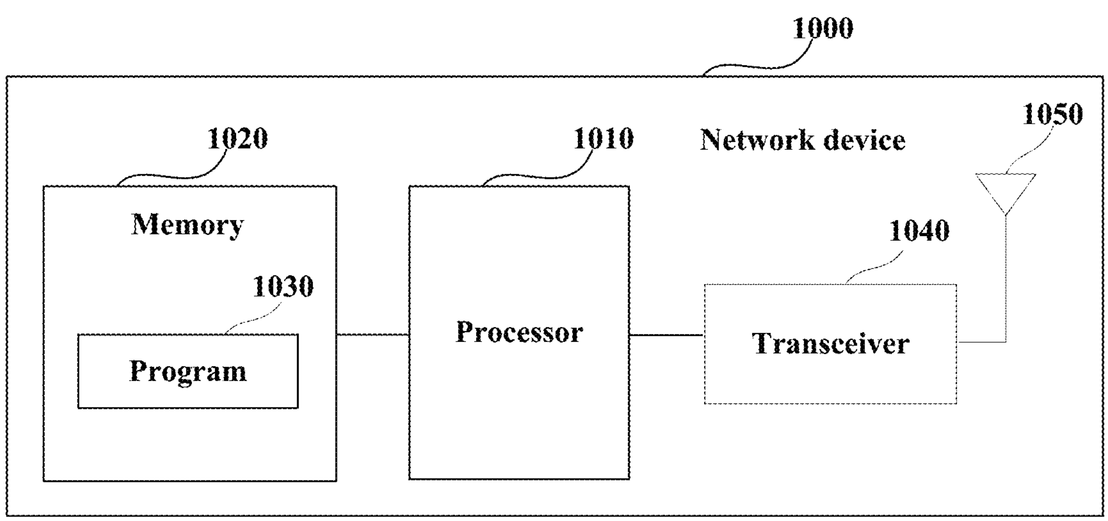
FIG. 10 is a schematic diagram of a network device in the embodiments of the present disclosure.

FIG. 10 is a composition schematic diagram of a network device in the embodiments of the present disclosure. As shown in FIG. 10, the network device 1000 may include: a processor 1010 (such as a central processing unit (CPU))

and a memory 1020; the memory 1020 is coupled to the processor 1010. The memory 1020 can store various data; moreover, also stores a program 1030 for information processing, and executes the program 1030 under the control of the processor 1010.

In addition, as shown in FIG. 10, the network device 1000 may further include: a transceiver 1040 and an antenna 1050, etc.; wherein the functions of said components are similar to relevant arts, which are not repeated here. It's worth noting that the network device 1000 does not have to include all the components shown in FIG. 10. Moreover, the network device 1000 may also include components not shown in FIG. 10, relevant arts can be referred to.

The embodiments of the present disclosure further provide a terminal equipment, but the present disclosure is not limited to this, it may also be other device.

Figure 11:
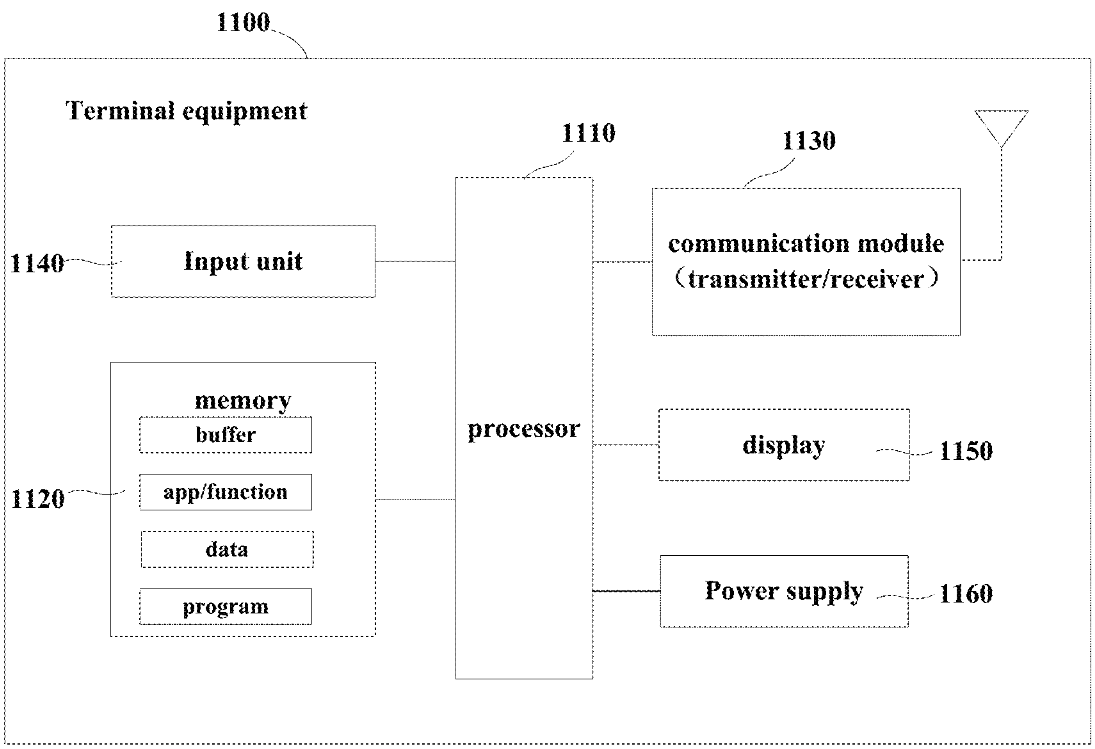
FIG. 11 is a schematic diagram of a terminal equipment in the embodiments of the present disclosure.

FIG. 11 is a schematic diagram of a terminal equipment in the embodiments of the present disclosure. As shown in FIG. 11, the terminal equipment 1100 may include a processor 1110 and a memory 1120; the memory 1120 stores data and programs, and is coupled to the processor 1110. It's worth noting that this figure is exemplary; other types of structures can also be used to supplement or replace this structure, so as to realize a telecommunication function or other functions.

For example, the processor 1110 can be configured to execute a program to implement the method for reporting beam failure information as described in the embodiments of the first aspect. For example, the processor 1110 is configured to perform the following control: determining that a secondary cell in which a beam failure occurs has completed candidate beam detection based on a synchronization signal block (SSB) or a channel state information reference signal (CSI-RS); and reporting to a network device that a beam failure occurs in the secondary cell.

For example, the processor 1110 can be configured to execute a program to implement the method for reporting beam failure information as described in the embodiments of the second aspect. For example, the processor 1110 is configured to perform the following control: determining that it has completed candidate beam detection based on a synchronization signal block (SSB) or a channel state information reference signal (CSI-RS) in a secondary cell in which a beam failure occurs; and reporting to a network device a media access control (MAC) protocol data unit (PDU) including beam failure information of a secondary cell.

For example, the processor 1110 can be configured to execute a program to implement the method for reporting beam failure information as described in the embodiments of the third aspect. For example, the processor 1110 is configured to perform the following control: before candidate beam detection based on a synchronization signal block or a channel state information reference signal has been completed in the secondary cell, or before one or more candidate beam identifiers of the secondary cell are received, or during an evaluation period of the candidate beam detection based on a synchronization signal block or a channel state information reference signal in the secondary cell, not reporting that a beam failure occurs in the secondary cell, and/or, not instructing a multiplexing and assembly procedure to generate a beam failure recovery (BFR) media access control (MAC) control element (CE) or a truncated beam failure recovery (BFR) media access control (MAC) control element (CE).

For example, the processor 1110 can be configured to execute a program to implement the method for reporting beam failure information as described in the embodiments of the fourth aspect. For example, the processor 1110 is configured to perform the following control: detecting that a beam failure occurs in a secondary cell; and in a case where the secondary cell is configured on the media access control (MAC) entity, reporting a beam failure recovery (BFR) media access control (MAC) control element (CE) or a truncated beam failure recovery (BFR) media access control (MAC) control element (CE) for the media access control (MAC) entity.

As shown in FIG. 11, the terminal equipment 1100 may further include: a communication module 1130, an input unit 1140, a display 1150 and a power source 1160. The functions of said components are similar to relevant arts, which are not repeated here. It's worth noting that the terminal equipment 1100 does not have to include all the components shown in FIG. 11, said components are not indispensable. Moreover, the terminal equipment 1100 may also include components not shown in FIG. 11, relevant arts can be referred to.

The embodiments of the present disclosure also provide a computer program, wherein when a terminal equipment executes the program, the program enables the terminal equipment to execute the method for reporting beam failure information as described in the embodiments of the first to fourth aspects.

The embodiments of the present disclosure further provide a storage medium in which a computer program is stored, wherein the computer program enables a terminal equipment to execute the method for reporting beam failure information as described in the embodiments of the first to fourth aspects.

The apparatus and method in the present disclosure can be realized by hardware, or can be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The present disclosure also relates to a storage medium storing the program, such as a hard disk, a magnetic disk, an optical disk, a DVD, a flash memory and the like.

By combining with the method/apparatus described in the embodiments of the present disclosure, it can be directly reflected as hardware, a software executed by a processor, or a combination of the two. For example, one or more in the functional block diagram or one or more combinations in the functional block diagram as shown in the figures may correspond to software modules of a computer program flow, and may also correspond to hardware modules. These software modules may respectively correspond to the steps as shown in the figures. These hardware modules can be realized by solidifying these software modules e.g. using a field-programmable gate array (FPGA).

A software module can be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal.

For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the figures can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the figures can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the spirit and principle of the present disclosure, these variations and modifications are also within the scope of the present disclosure.

As for the implementations including the above embodiments, the following supplements are also disclosed:

Supplement 1. A method for reporting beam failure information, including:

determining, by a terminal equipment, that it has completed candidate beam detection based on a synchronization signal block (SSB) or a channel state information reference signal (CSI-RS) a secondary cell in which a beam failure occurs; and reporting to a network device that a beam failure occurs in the secondary cell.

Supplement 2. The method according to Supplement 1, wherein determining, by the terminal equipment, that a secondary cell in which a beam failure occurs has completed candidate beam detection based on a synchronization signal block (SSB) or a channel state information reference signal (CSI-RS) includes:

determining, by a media access control (MAC) entity of the terminal equipment, that the candidate beam detection based on a synchronization signal block or a channel state information reference signal has been completed in the secondary cell, and/or receiving one or more candidate beam identifiers of the secondary cell by the media access control (MAC) entity of the terminal equipment from a lower layer.

Supplement 3. The method according to Supplement 1 or 2, wherein the method further includes:

before the candidate beam detection based on a synchronization signal block or a channel state information reference signal has been completed in the secondary cell, or before one or more candidate beam identifiers of the secondary cell from a lower layer are received, or during an evaluation period of the candidate beam detection based on a synchronization signal block or a channel state information reference signal in the secondary cell, not reporting by the media access control (MAC) entity of the terminal equipment that a beam failure occurs in the secondary cell.

Supplement 4. The method according to Supplement 3, wherein the method further includes:

in a case where the secondary cell has triggered beam failure recovery and the beam failure recovery is not canceled, generating a corresponding media access control (MAC) control element (CE) or truncated media Access control (MAC) control element (CE), and assembling a media access control (MAC) protocol data unit (PDU).

Supplement 5. The method according to Supplement 4, wherein the media access control (MAC) entity does not report that a beam failure occurs in the secondary cell, in the media access control (MAC) control element (CE) or truncated media access control (MAC) control element (CE).

Supplement 6. The method according to Supplement 5, wherein the media access control (MAC) entity sets indication information (Ci field) to which the secondary cell corresponds to be 0 in the media access control (MAC) control element (CE) or the truncated media access control (MAC) control element (CE), and a field (AC field) carrying candidate beam information to which the secondary cell corresponds is not included.

Supplement 7. The method according to Supplement 5 or 6, wherein the media access control (MAC) entity instructs a multiplexing and assembly procedure to generate a beam failure recovery (BFR) media access control (MAC) control element (CE), and a beam failure recovery (BFR) media access control (MAC) control element (CE) or a truncated beam failure recovery (BFR) media access control (MAC) control element (CE) is generated in the multiplexing and assembly procedure; or the media access control (MAC) entity instructs a multiplexing and assembly procedure to generate a truncated beam failure recovery (BFR) media access control (MAC) control element (CE), and a beam failure recovery (BFR) media access control (MAC) control element (CE) or a truncated beam failure recovery (BFR) media access control (MAC) control element (CE) is generated in the multiplexing and assembly procedure.

Supplement 8. The method according to Supplement 5 or 6, wherein the media access control (MAC) entity instructs a multiplexing and assembly procedure to generate a media access control (MAC) control element (CE) carrying beam failure and recovery information of a secondary cell, and a beam failure recovery (BFR) media access control (MAC) control element (CE) or a truncated beam failure recovery (BFR) media access control (MAC) control element (CE) is generated in the multiplexing and assembly procedure.

Supplement 9. The method according to Supplement 8, wherein in the multiplexing and assembly procedure, it is determined whether the beam failure recovery (BFR) media access control (MAC) control element (CE) or the truncated beam failure recovery (BFR) media access control (MAC) control element (CE) is generated.

Supplement 10. The method according to Supplement 5 or 6, wherein the media access control (MAC) entity instructs a multiplexing and assembly procedure to generate a beam failure recovery (BFR) media access control (MAC) control element (CE), and once the instruction of the media access control (MAC) entity is received, the beam failure recovery (BFR) media access control (MAC) control element (CE) is generated in the multiplexing and assembly procedure; or the media access control (MAC) entity instructs a multiplexing and assembly procedure to generate a truncated beam failure recovery (BFR) media access control (MAC) control element (CE), and once the instruction of the media access control (MAC) entity is received, the truncated beam failure recovery (BFR) media access control (MAC) control element (CE) is generated in the multiplexing and assembly procedure.

Supplement 11. The method according to any one of Supplements 5 to 10, wherein the method further includes:

in a case where a highest serving cell index that is less than 8 with indication information (Ci field) to which a secondary cell in a media access control (MAC) entity corresponds set to be 1, a beam failure recovery (BFR) media access control (MAC) control element (CE) of a first format is used, and in a case where the highest serving cell index that is greater than or equal to 8 with indication information (Ci field) set to be 1, a beam failure recovery (BFR) media access control (MAC) control element (CE) of a second format is used.

Supplement 12. The method according to any one of Supplements 5 to 10, wherein the method further includes:

in a case where a highest serving cell index that is less than 8 with indication information (Ci field) to which a secondary cell in a media access control (MAC) entity corresponds set to be 1, or a beam failure is detected in a special cell and the special cell is to be included in a truncated beam failure recovery (BFR) media access control (MAC) control element (CE) and an uplink resource is unable to accommodate a truncated beam failure recovery (BFR) media access control (MAC) control element (CE) of a second format, a truncated beam failure recovery (BFR) media access control (MAC) control element (CE) of a first format is used by a terminal equipment; otherwise, a truncated beam failure recovery (BFR) media access control (MAC) control element (CE) of a second format is used by a terminal equipment.

Supplement 13. A method for reporting beam failure information, including:

determining, by a terminal equipment, that it has completed candidate beam detection based on a synchronization signal block (SSB) or a channel state information reference signal (CSI-RS) in a secondary cell in which a beam failure occurs; and reporting to a network device a media access control (MAC) protocol data unit (PDU) including beam failure information of the secondary cell.

Supplement 14. The method according to Supplement 13, wherein determining, by the terminal equipment, that it has completed candidate beam detection based on a synchronization signal block (SSB) or a channel state information reference signal (CSI-RS) in a secondary cell in which a beam failure occurs includes:

determining, by a media access control (MAC) entity of the terminal equipment, that the candidate beam detection based on a synchronization signal block or a channel state information reference signal has been completed in the secondary cell, or receiving one or more candidate beam identifiers of the secondary cell by the media access control (MAC) entity of the terminal equipment from a lower layer.

Supplement 15. The method according to Supplement 13 or 14, wherein the method further includes:

before the candidate beam detection based on a synchronization signal block or a channel state information reference signal has been completed in the secondary cell, or before one or more candidate beam identifiers of the secondary cell from a lower layer are received, or during an evaluation period of the candidate beam detection based on a synchronization signal block or a channel state information reference signal in the secondary cell, the media access control (MAC) entity of the terminal equipment does not instruct a multiplexing and assembly procedure to generate a beam failure recovery (BFR) media access control (MAC) control element (CE) or a truncated beam failure recovery (BFR) media access control (MAC) control element (CE).

Supplement 16. The method according to Supplement 15, wherein the media access control (MAC) entity of the terminal equipment does not instruct a multiplexing and assembly procedure to generate a beam failure recovery (BFR) media access control (MAC) control element (CE) or a truncated beam failure recovery (BFR) media access control (MAC) control element (CE), which includes:

in a case where the secondary cell has triggered beam failure recovery and has not canceled, that there is an available uplink resource and that the uplink resource can accommodate a beam failure recovery (BFR) media access control (MAC) control element (CE) or a truncated beam failure recovery (BFR) media access control (MAC) control element (CE), the media access control (MAC) entity does not instructs the multiplexing and assembly procedure to generate the beam failure recovery (BFR) media access control (MAC) control element (CE) or the truncated beam failure recovery (BFR) media access control (MAC) control element (CE).

Supplement 17. The method according to Supplement 15, wherein the method further includes:

in a case where at least one piece of beam failure recovery is triggered and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity (MAC) instructs the multiplexing and assembly procedure to generate a beam failure recovery (BFR) media access control (MAC) control element (CE) or a truncated beam failure recovery (BFR) media access control (MAC) control element (CE), or triggers a scheduling request (SR).

Supplement 18. The method according to Supplement 15, wherein the method further includes:

in a case where a beam failure recovery is triggered on at least one secondary cell and is not cancelled and candidate beam detection based on a synchronization signal block or a channel state information reference signal in at least one secondary cell is completed, or candidate beam identifiers of at least one secondary cell from a lower layer are received, according to an uplink resource, the media access control entity (MAC) instructs the multiplexing and assembly procedure to generate a beam failure recovery (BFR) media access control (MAC) control element (CE) or a truncated beam failure recovery (BFR) media access control (MAC) control element (CE), or triggers a scheduling request (SR).

Supplement 19. The method according to any one of Supplements 3 to 18, wherein the method further includes:

when a terminal equipment transmits a media access control (MAC) protocol data unit (PDU) including secondary cell beam failure information, beam failure recovery having been triggered on the secondary cell before the media access control (MAC) protocol data unit (PDU) is assembled is not cancelled.

Supplement 20. The method according to any one of Supplements 1 to 19, wherein the method further includes:

in a case where the secondary cell is configured on the media access control (MAC) entity, the media access control (MAC) entity of a terminal equipment generates a beam failure recovery (BFR) media access control (MAC) control element (CE) or a truncated beam failure recovery (BFR) media access control (MAC) control element (CE) for the media access control (MAC) entity.

Supplement 21. The method according to Supplement 20, wherein indication information (Ci field) of the beam failure recovery (BFR) media access control (MAC) control element (CE) is set to be 1, which indicates that a beam failure is detected in a secondary cell of a serving cell with an index i configured on the media access control (MAC) entity and candidate beam information is included;

indication information (Ci field) of the beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

Supplement 22. The method according to Supplement 20, wherein indication information (Ci field) of the truncated beam failure recovery (BFR) media access control (MAC) control element (CE) is set to be 1, which indicates that a beam failure is detected in a secondary cell of a serving cell with an index i configured on the media access control (MAC) entity and candidate beam information is included;

indication information (Ci field) of the truncated beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

Supplement 23. A method for reporting beam failure information, including:

detecting, by a terminal equipment, that a beam failure occurs in a secondary cell;

before candidate beam detection based on a synchronization signal block or a channel state information reference signal has been completed in the secondary cell, or before one or more candidate beam identifiers of the secondary cell are received, or during an evaluation period of the candidate beam detection based on a synchronization signal block or a channel state information reference signal in the secondary cell, not reporting, by the terminal equipment, that a beam failure occurs in the secondary cell, and/or, not instructing a multiplexing and assembly procedure to generate a beam failure recovery (BFR) media access control (MAC) control element (CE) or a truncated beam failure recovery (BFR) media access control (MAC) control element (CE).

Supplement 24. The method according to Supplement 23, wherein the method further includes:

in a case where beam failure recovery is triggered in multiple cells and candidate beam detection has been completed in at least one cell, the terminal equipment does not report that a beam failure occurs in the second cell;

in a case where beam failure recovery is triggered in multiple cells and candidate beam detection has not been completed in all cells in which beam failure recovery is triggered, the terminal equipment does not instruct a multiplexing and assembly procedure to generate a beam failure recovery (BFR) media access control (MAC) control element (CE) or a truncated beam failure recovery (BFR) media access control (MAC) control element (CE).

Supplement 25. A method for reporting beam failure information, including:

detecting, by a terminal equipment, that a beam failure occurs in a secondary cell; and in a case where the secondary cell is configured on the media access control (MAC) entity, reporting a beam failure recovery (BFR) media access control (MAC) control element (CE) or a truncated beam failure recovery (BFR) media access control (MAC) control element (CE) for the media access control (MAC) entity.

Supplement 26. The method according to Supplement 25, wherein indication information (Ci field) of the beam failure recovery (BFR) media access control (MAC) control element (CE) is set to be 1, which indicates that a beam failure is detected in a secondary cell of a serving cell with an index i configured on the media access control (MAC) entity and candidate beam information is included;

indication information (Ci field) of the beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

Supplement 27. The method according to Supplement 25, wherein indication information (Ci field) of the truncated beam failure recovery (BFR) media access control (MAC) control element (CE) is set to be 1, which indicates that a beam failure is detected in a secondary cell of a serving cell with an index i configured on the media access control (MAC) entity and candidate beam information is included;

indication information (Ci field) of the truncated beam failure recovery (BFR) media access control (MAC) control element (CE) is set to be 0, which indicates that a secondary cell of a serving cell with an index i is not configured on the media access control (MAC) entity, or a beam failure is not detected in the secondary cell and candidate beam information is not included.

Supplement 28. A terminal equipment, including a memory and a processor, the memory storing a computer program, and the processor being configured to execute the method for reporting beam failure information according to any one of Supplements 1 to 27.

Supplement 29. A communication system, including:

a terminal equipment configured to determine that it has completed candidate beam detection based on a synchronization signal block (SSB) or a channel state information reference signal (CSI-RS) in a secondary cell in which a beam failure occurs; and report that a beam failure occurs in the secondary cell, or report a media access control (MAC) protocol data unit (PDU) including beam failure information of a secondary cell;

a network device configured to receive reporting information in which the beam failure occurs in the secondary cell, or a media access control (MAC) protocol data unit (PDU) including beam failure information of the secondary cell.

The invention claimed is:

1. An apparatus for reporting beam failure information, comprising:

processor circuitry configured to detect one or more candidate beams; and a transmitter configured to report a beam failure in a secondary cell in which candidate beam evaluation based on a synchronization signal block or a channel state information reference signal has been completed, wherein in a case where a highest serving cell index of a serving cell including the secondary cell that is less than 8 for which the beam failure is detected and the candidate beam evaluation has been completed, a beam failure recovery media access control control element of a first format is used, and in a case where the highest serving cell index of a serving cell including the secondary cell that is greater than or equal to 8 for which the beam failure is detected and the candidate beam evaluation has been completed, a beam failure recovery media access control control element of a second format is used, wherein the first format includes 1 oct including Ci fields, and the second format includes 4 octs including Ci fields.

2. The apparatus according to claim 1, wherein the transmitter is further configured to perform at least one of:

determine by a media access control entity that the candidate beam evaluation based on a synchronization signal block or a channel state information reference signal has been completed in the secondary cell, and receive one or more candidate beam identifiers of the secondary cell by the media access control entity from a lower layer.

3. The apparatus according to claim 1, wherein the transmitter is further configured to:

before the candidate beam evaluation based on a synchronization signal block or a channel state information reference signal has been completed in the secondary cell, or before one or more candidate beam identifiers of the secondary cell from a lower layer are received, or during an evaluation period of candidate beam evaluation based on a synchronization signal block or a channel state information reference signal in the secondary cell, not to report by a media access control entity that the beam failure occurs in the secondary cell.

4. The apparatus according to claim 3, wherein the processor circuitry is further configured to, in a case where the secondary cell has triggered beam failure recovery and the beam failure recovery is not cancelled, generate a media access control control element or a truncated media access control control element and assemble a media access control protocol data unit; and the media access control entity does not report in the media access control control element or the truncated media access control control element that the beam failure occurs in the secondary cell.

5. The apparatus according to claim 4, wherein the media access control entity sets indication information to which the secondary cell corresponds to be 0 in the media access control control element or the truncated media access control control element, and does not include a field carrying candidate beam information to which the secondary cell corresponds.

6. The apparatus according to claim 4, wherein the media access control entity instructs a multiplexing and assembly procedure to generate a beam failure recovery media access control control element, and the beam failure recovery media access control control element or a truncated beam failure recovery media access control control element is generated in the multiplexing and assembly procedure, or the media access control entity instructs a multiplexing and assembly procedure to generate a truncated beam failure recovery media access control control element, and a beam failure recovery media access control control element or the truncated beam failure recovery media access control control element is generated in the multiplexing and assembly procedure.

7. The apparatus according to claim 4, wherein the media access control entity instructs a multiplexing and assembly procedure to generate a media access control control element carrying beam failure and recovery information of a secondary cell, and a beam failure recovery media access control control element or a truncated beam failure recovery media access control control element is generated in the multiplexing and assembly procedure;

and in the multiplexing and assembly procedure, it is determined whether the beam failure recovery media access control control element or the truncated beam failure recovery media access control control element is generated.

8. The apparatus according to claim 4, wherein the media access control entity instructs a multiplexing and assembly procedure to generate a beam failure recovery media access control control element, and once an instruction of the media access control entity is received, the beam failure recovery media access control control element is generated in the multiplexing and assembly procedure; or the media access control entity instructs a multiplexing and assembly procedure to generate a truncated beam failure recovery media access control control element, and once the instruction of the media access control entity is received, the truncated beam failure recovery media access control control element is generated in the multiplexing and assembly procedure.

9. The apparatus according to claim 4, wherein in a case where a highest serving cell index that is less than 8 with indication information to which a secondary cell in a media access control entity corresponds set to be 1, a beam failure recovery media access control control element of a first format is used, in a case where the highest serving cell index that is greater than or equal to 8 with indication information set to be 1, a beam failure recovery media access control control element of a second format is used.

10. The apparatus according to claim 4, wherein in a case where a highest serving cell index that is less than 8 with indication information to which a secondary cell in a media access control entity corresponds set to be 1, or a beam failure is detected in a special cell and the special cell is to be included in a truncated beam failure recovery media access control control element and an uplink resource is unable to accommodate a truncated beam failure recovery media access control control element of a second format, a truncated beam failure recovery media access control control element of a first format is used; otherwise, a truncated beam failure recovery media access control control element of a second format is used.

11. The apparatus according to claim 1, wherein in transmitting a media access control protocol data unit including beam failure information of a secondary cell, beam failure recovery having been triggered on the secondary cell before the media access control protocol data unit is assembled is not cancelled.

12. The apparatus according to claim 1, wherein in a case where the secondary cell is configured on a media access control entity, the media access control entity generates a beam failure recovery media access control control element or a truncated beam failure recovery media access control control element for the media access control entity.

13. The apparatus according to claim 12, wherein indication information of the beam failure recovery media access control control element is set to be 1 indicates that a beam failure is detected in a secondary cell of a serving cell with an index i configured on the media access control entity and candidate beam information is included; indication information of the beam failure recovery media access control control element is set to be 0 indicates that a secondary cell of a serving cell with an index i is not configured on the media access control entity, or a beam failure is not detected in the secondary cell and candidate beam information is not included;

indication information of the truncated beam failure recovery media access control control element is set to be 1 indicates that a beam failure is detected in a secondary cell of a serving cell with an index i configured on the media access control entity and candidate beam information is included; indication information of the truncated beam failure recovery media access control control element is set to be 0 indicates that a secondary cell of a serving cell with an index i is not configured on the media access control entity, or a beam failure is not detected in the secondary cell and candidate beam information is not included.

14. The apparatus according to claim 1, wherein, before the candidate beam evaluation based on a synchronization signal block or a channel state information reference signal has been completed in the secondary cell, the processor circuitry is further configured to, in a case where the secondary cell has triggered beam failure recovery and the beam failure recovery is not cancelled, generate a corresponding media access control control element or a truncated media access control control element and assembly a media access control protocol data unit; and the media access control entity does not report in the media access control control element or the truncated media access control control element that a beam failure occurs in the secondary cell, wherein the media access control entity sets indication information to which the secondary cell corresponds to be 0 in the media access control control element or the truncated media access control control element, and does not include a field carrying candidate beam information to which the secondary cell corresponds.

15. An apparatus for reporting beam failure information, comprising:

processor circuitry configured to detect one or more candidate beams; and a transmitter configured to report to a network device a media access control protocol data unit including beam failure information on a secondary cell in which candidate beam evaluation based on a synchronization signal block or a channel state information reference signal has been completed, wherein in a case where a highest serving cell index of a serving cell including the secondary cell that is less than 8 for which the beam failure is detected and the candidate beam evaluation has been completed, a beam failure recovery media access control control element of a first format is used, and in a case where the highest serving cell index of a serving cell including the secondary cell that is greater than or equal to 8 for which the beam failure is detected and the candidate beam evaluation has been completed, a beam failure recovery media access control control element of a second format is used, wherein the first format includes 1 oct including Ci fields, and the second format includes 4 octs including Ci fields.

16. The apparatus according to claim 15, wherein the transmitter is further configured to perform at least one of:

determine by a media access control entity that the candidate beam evaluation based on a synchronization signal block or a channel state information reference signal has been completed in the secondary cell, and receive one or more candidate beam identifiers of the secondary cell by the media access control entity from a lower layer.

17. The apparatus according to claim 15, wherein before the candidate beam detection based on a synchronization signal block or a channel state information reference signal has been completed in the secondary cell, or before one or more candidate beam identifiers of the secondary cell from a lower layer are received, or during an evaluation period of the candidate beam evaluation based on a synchronization signal block or a channel state information reference signal in the secondary cell, a media access control entity does not instruct a multiplexing and assembly procedure to generate a beam failure recovery media access control control element or a truncated beam failure recovery media access control control element.

18. The apparatus according to claim 17, wherein in a case where at least one piece of beam failure recovery is triggered and is not cancelled and candidate beam evaluation based on a synchronization signal block or a channel state information reference signal in at least one secondary cell is completed, or candidate beam identifiers of at least one secondary cell from a lower layer are received, according to an uplink resource, the media access control entity instructs the multiplexing and assembly procedure to generate a beam failure recovery media access control control element or a truncated beam failure recovery media access control control element, or triggers a scheduling request.

* * * * *